(12) United States Patent
Takagi et al.

(10) Patent No.: US 10,802,289 B2
(45) Date of Patent: Oct. 13, 2020

(54) VIRTUAL IMAGE DISPLAY DEVICE

(71) Applicant: SEIKO EPSON CORPORATION, Tokyo (JP)

(72) Inventors: Masayuki Takagi, Shiojiri (JP); Takahiro Totani, Suwa (JP); Toshiaki Miyao, Matsumoto (JP); Akira Komatsu, Kamiina-gun (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 192 days.

(21) Appl. No.: 15/956,207

(22) Filed: Apr. 18, 2018

(65) Prior Publication Data

US 2018/0231787 A1  Aug. 16, 2018

Related U.S. Application Data

(62) Division of application No. 14/622,053, filed on Feb. 13, 2015, now Pat. No. 9,971,158, which is a division
(Continued)

(30) Foreign Application Priority Data

Sep. 30, 2011  (JP) ................................. 2011-216712

(51) Int. Cl.
*G02B 27/01* (2006.01)
*G02B 6/08* (2006.01)

(52) U.S. Cl.
CPC ..... *G02B 27/0176* (2013.01); *G02B 27/0101* (2013.01); *G02B 27/0149* (2013.01);
(Continued)

(58) Field of Classification Search
None
See application file for complete search history.

(56) References Cited

U.S. PATENT DOCUMENTS

| 2003/0165017 A1 | 9/2003 | Amitai |
| 2004/0085649 A1 | 5/2004 | Repetto et al. |

(Continued)

FOREIGN PATENT DOCUMENTS

| JP | H10-698 A | 1/1998 |
| JP | 2000-511306 A | 8/2000 |

(Continued)

OTHER PUBLICATIONS

Sep. 26, 2013 Office Action issued in U.S. Appl. No. 13/601,261.
(Continued)

*Primary Examiner* — William R Alexander
*Assistant Examiner* — Gary W O'Neill
(74) *Attorney, Agent, or Firm* — Oliff PLC

(57) ABSTRACT

A virtual image display device has a light guide device in which the half mirror layer (the semi-transmissive reflecting film) of the light guide member is formed on the partial area of the first junction surface, and the second junction surface of the light transmitting member is bonded to the first junction surface in at least the exceptional area. Therefore, it is possible to increase the bonding strength of the first junction surface and the second junction surface, namely the strength of the light guide device composed of the light guide member and the light transmitting member combined with each other even in the case in which the attachment force of the half mirror layer (the semi-transmissive reflecting film) with respect to the first junction surface is not sufficiently strong.

11 Claims, 15 Drawing Sheets

Related U.S. Application Data of application No. 13/601,261, filed on Aug. 31, 2012, now Pat. No. 8,976,452.

(52) U.S. Cl.
CPC ............ *G02B 27/0172* (2013.01); *G02B 6/08* (2013.01); *G02B 2027/0125* (2013.01); *G02B 2027/0169* (2013.01); *G02B 2027/0178* (2013.01)

(56) References Cited

U.S. PATENT DOCUMENTS

| | | |
|---|---|---|
| 2007/0008624 A1 | 1/2007 | Hirayama |
| 2007/0047091 A1 | 3/2007 | Spitzer et al. |
| 2007/0091445 A1 | 4/2007 | Amitai |
| 2008/0151379 A1* | 6/2008 | Amitai ................. G02B 27/283 359/630 |
| 2008/0239422 A1 | 10/2008 | Noda |
| 2010/0033830 A1 | 2/2010 | Yung |
| 2010/0103078 A1 | 4/2010 | Mukawa et al. |
| 2010/0245211 A1 | 9/2010 | Iba et al. |
| 2012/0062998 A1* | 3/2012 | Schultz ............ B29D 11/00663 359/630 |
| 2013/0033756 A1 | 2/2013 | Spitzer et al. |
| 2013/0070338 A1 | 3/2013 | Gupta et al. |

FOREIGN PATENT DOCUMENTS

| | | |
|---|---|---|
| JP | 2006-153967 A | 6/2006 |
| JP | 2006-162792 A | 6/2006 |
| JP | 2008-535001 A | 8/2008 |
| JP | 2009-134087 A | 6/2009 |
| JP | 2009-157520 A | 7/2009 |
| JP | 2010-224473 A | 10/2010 |
| WO | 1998-015868 A1 | 4/1998 |

OTHER PUBLICATIONS

Mar. 21, 2014 Office Action issued in U.S. Appl. No. 13/601,261.
Jul. 10, 2014 Notice of Allowance issued in U.S. Appl. No. 13/601,261.
Nov. 7, 2014 Notice of Allowance issued in U.S. Appl. No. 13/601,261.
Aug. 12, 2016 Office Action issued in U.S. Appl. No. 14/622,053.
Apr. 7, 2017 Office Action issued in U.S. Appl. No. 14/622,053.
Oct. 3, 2017 Office Action issued in U.S. Appl. No. 14/622,053.
Dec. 30, 2015 Office Action issued in U.S. Appl. No. 14/622,053.
Jan. 12, 2018 Notice of Allowance issued in U.S. Appl. No. 14/622,053.

* cited by examiner

VIRTUAL IMAGE DISPLAY DEVICE

This is a Divisional Application of U.S. application Ser. No. 14/622,053 filed Feb. 13, 2015, which is a Divisional Application of U.S. application Ser. No. 13/601,261 filed Aug. 31, 2012, which claims priority to JP 2011-216712 filed Sep. 30, 2011. The disclosures of the prior applications are hereby incorporate by reference herein in their entireties.

BACKGROUND

1. Technical Field

The present invention relates to a virtual image display device such as a head-mounted display used while worn on the head.

2. Related Art

In recent years, as a virtual image display device such as a head-mounted display for making formation and observation of a virtual image possible, there have been proposed various devices, which are a type of guiding the image light from a display element to the pupils of the observer using a light guide plate.

In such a virtual display device, in order for overlapping the image light and the external light, there has been proposed a see-through optical system (see, e.g., JP-A-2010-224473 (Document 1)).

However, in the device described in Document 1, since the see-through property is realized by a pupil division method using a light guide optical system with an emission opening smaller in size than the pupil, it is difficult to increase the display size of a virtual image. Further, since the light guide optical system smaller in size than the pupil is used, it is difficult to increase the effective pupil diameter (which is the lighting diameter for enabling acquisition of a virtual image, and is also referred to as an eye ring diameter) in order to correspond to individual human pupil distance. Further, since the emission opening and the housing of the light guide optical system are arranged in the physical vicinity of the pupil, a blind area is caused, and it cannot be called a perfect see-through state.

It should be noted that as an optical system for a head-mounted display, there has existed a system provided with a light guide member capable of making a plurality of optical modes different in light guide angle proceed (see JP-T-2008-535001 (Document 2). In such an optical system as described above, it is also possible to adopt a half mirror as a third optical surface on the exit side, and flatten the entire surface by attaching a prism-like member to the light guide member so as to bury the half mirror inside to thereby modify the system into a see-through light guide device enabling the observation of the external light through the half mirror.

However, there is a possibility that a strong force is applied to the part where the light guide member and the prism-like member are bonded to each other, and if the bonding strength between the members is not sufficient, exfoliation is caused in the bonded part, and there is a possibility of damaging the light guide device.

SUMMARY

An advantage of some aspects of the invention is to provide a virtual image display device equipped with a light guide device, which is formed by bonding a plurality of members, and has a sufficient strength.

A virtual image display device according to an aspect of the invention includes (a) an image display device adapted to form an image light, (b) a projection optical system adapted to form a virtual image by the image light emitted from the image display device, (c) a light guide member including a light entrance section adapted to take in the image light having passed through the projection optical system, a light guide section adapted to guide the image light taken in from the light entrance section using total reflection by a first surface and a second surface opposed to each other, and a light exit section adapted to take out the image light having passed through the light guide section, and (d) a light transmitting member adapted to make observation of external light possible by being bonded to the light guide member, (e) the light guide member has a semi-transmissive reflecting film, which bends the image light and transmits the external light, disposed on a partial area of a first junction surface to be bonded to the light transmitting member, and (f) the light transmitting member has a second junction surface opposed to the first junction surface including an exceptional area excluding the partial area, and bonded to the first junction surface with an adhesive in at least the exceptional area. Here, the semi-transmissive reflecting film is not limited to a metal reflecting film, but includes a multilayer film including a dielectric layer and so on, and a hologram element and so on.

In the virtual image display device described above, since the semi-transmissive reflecting film is formed on the partial area of the first junction surface, and the second junction surface of the light transmitting member is bonded to the first junction surface in at least the exceptional area, it is possible to increase the bonding strength between the first junction surface and the second junction surface, namely the strength of the light guide device composed of the light guide member and the light transmitting member combined with each other, even in the case in which the attachment force of the semi-transmissive reflecting film with respect to the first junction surface is not sufficiently strong.

According to a specific aspect of the invention, at least one of the exceptional area of the first junction surface and an opposed area of the second junction surface corresponding to the exceptional area includes a nonsmooth surface having an undulation. In this case, since the area of the bonding or junction can be increased due to the nonsmooth surface, the bonding strength between the first junction surface and the second junction surface can easily and surely be increased.

According to another specific aspect of the invention, the nonsmooth surface is a rough surface provided with a fine undulation by a roughening process. In this case, the process of the nonsmooth surface is easy, and the disturbance in the light beam passing through the first junction surface and the second junction surface can be suppressed.

According to still another specific aspect of the invention, the nonsmooth surface provided to the first junction surface and the nonsmooth surface provided to the second junction surface fit each other. In this case, alignment between the light guide member and the light transmitting member becomes possible via the first junction surface and the second junction surface.

According to yet another specific aspect of the invention, the nonsmooth surface provided to the first junction surface and the nonsmooth surface provided to the second junction surface have undulation shapes reverse to each other. In this case, it is possible to reduce an amount of the adhesive with which the space between the first junction surface and the second junction surface is filled.

According to still yet another specific aspect of the invention, in the first junction surface of the light guide member, the partial area adapted to support the semi-transmissive reflecting film is arranged in a central portion of the first junction surface with respect to a predetermined direction, and the exceptional area in a periphery of the semi-transmissive reflecting film corresponds to a peripheral area sandwiching the partial area on both ends in the predetermined direction. In the case in which the predetermined direction is a vertical direction, the semi-transmissive reflecting film is arranged in the central portion of the first junction surface in the vertical direction, and it is possible to dispose the transmitting area for making the observation of the external light possible without making the semi-transmissive reflecting film intervene in the upper and lower ends of the first junction surface.

According to further another specific aspect of the invention, the first junction surface is bonded to the second junction surface as a whole, and the peripheral area is the nonsmooth surface as a whole.

According to still further another specific aspect of the invention, the light guide member has the light entrance section, the light guide section, and the light exit section as an integrated member, the light entrance section has a third reflecting surface as a plane forming an obtuse angle with respect to either one of the first reflecting surface and the second reflecting surface, and the first junction surface of the light exit section has a fourth reflecting surface as a plane forming an obtuse angle with respect to either one of the first reflecting surface and the second reflecting surface. In this case, the image light reflected by the third reflecting surface of the light entrance section is propagated while being totally reflected by the first and second reflecting surfaces of the light guide section, and is then reflected by the fourth reflecting surface of the light exit section, and then enters the eye of the observer as the virtual image. It should be noted that by integrating the light entrance section, the light guide section, and the light exit section into an integrated member, it is possible to form the light guide device with high precision using the injection molding technology.

According to yet further another specific aspect of the invention, the light guide member, the light transmitting member, and the adhesive are formed of respective materials having roughly the same refractive indexes. In this case, the disturbance in the light beam in the first junction surface and the second junction surface is suppressed to thereby make the accurate observation of the external light possible. It should be noted that the phrase "roughly the same refractive indexes" means to allow so minute difference in refractive index that the light path is not disturbed although depending on the roughness of the bonding surface.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, some embodiments of the invention will be explained in detail with reference to the accompanying drawings.

A. Exterior Appearance of Virtual Image Display Device

Figure 1:
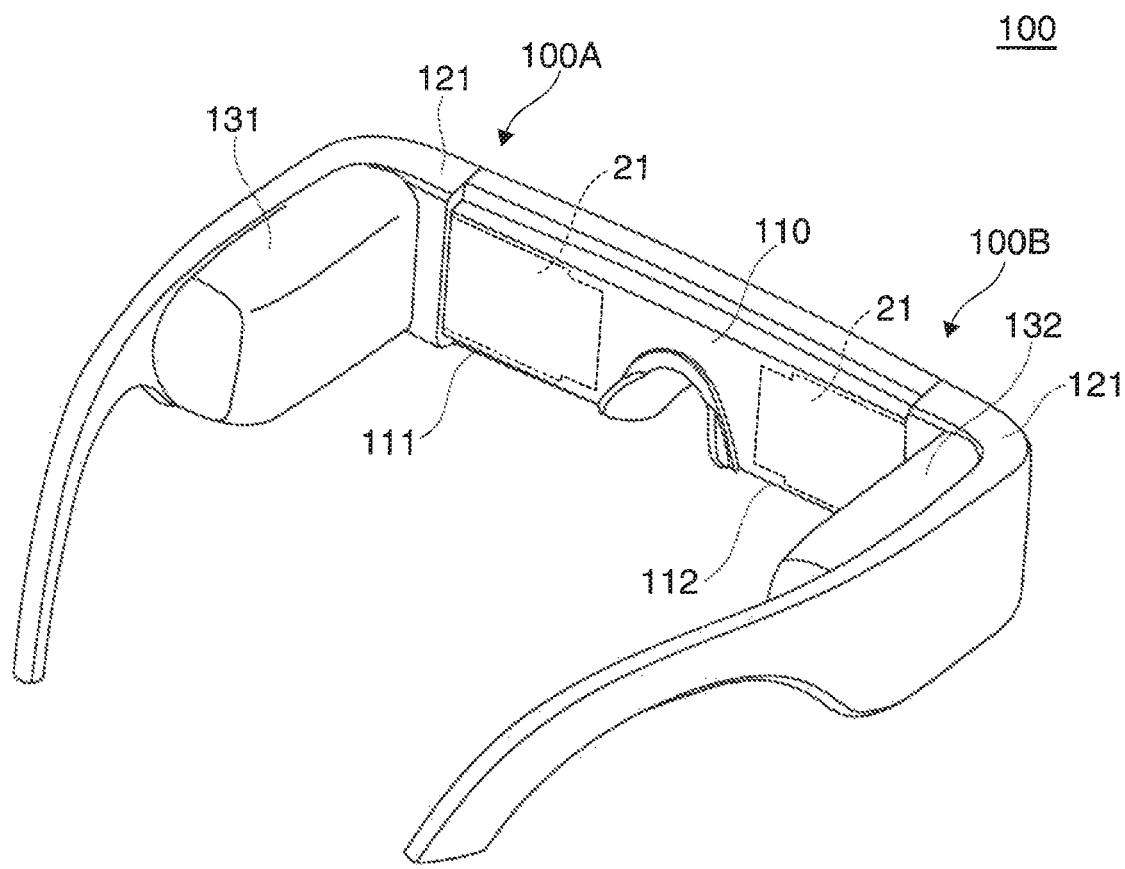
FIG. 1 is a perspective view showing a virtual image display device according to a first embodiment of the invention.

A virtual image display device 100 according to an embodiment shown in FIG. 1 is a head-mounted display having an exterior appearance like spectacles, and is capable of allowing the observer wearing the virtual image display device 100 to recognize image light of a virtual image, and at the same time allowing the observer to observe the external image in a see-through manner. The virtual image display device 100 is provided with an optical panel 110 for covering the front of the eyes of the observer, a frame 121 for supporting the optical panel 110, and first and second drive sections 131, 132 attached to respective portions each extending from an end piece to a temple of the frame 121. Here, the optical panel 110 has a first panel section 111 and a second panel section 112, and the both panel sections 111, 112 form a plate-like part integrally coupled on each other at the center thereof. A first display device 100A obtained by combining the first panel section 111 and the first drive section 131 located on the left in the drawing is a part for forming a virtual image for the left eye, and functions alone as a virtual image display device. Further, a second display device 100B obtained by combining the second panel section 112 and the second drive section 132 located on the right in the drawing is a part for forming a virtual image for the right eye, and functions alone as a virtual image display device.

B. Structure of Display Devices

Figure 2A:
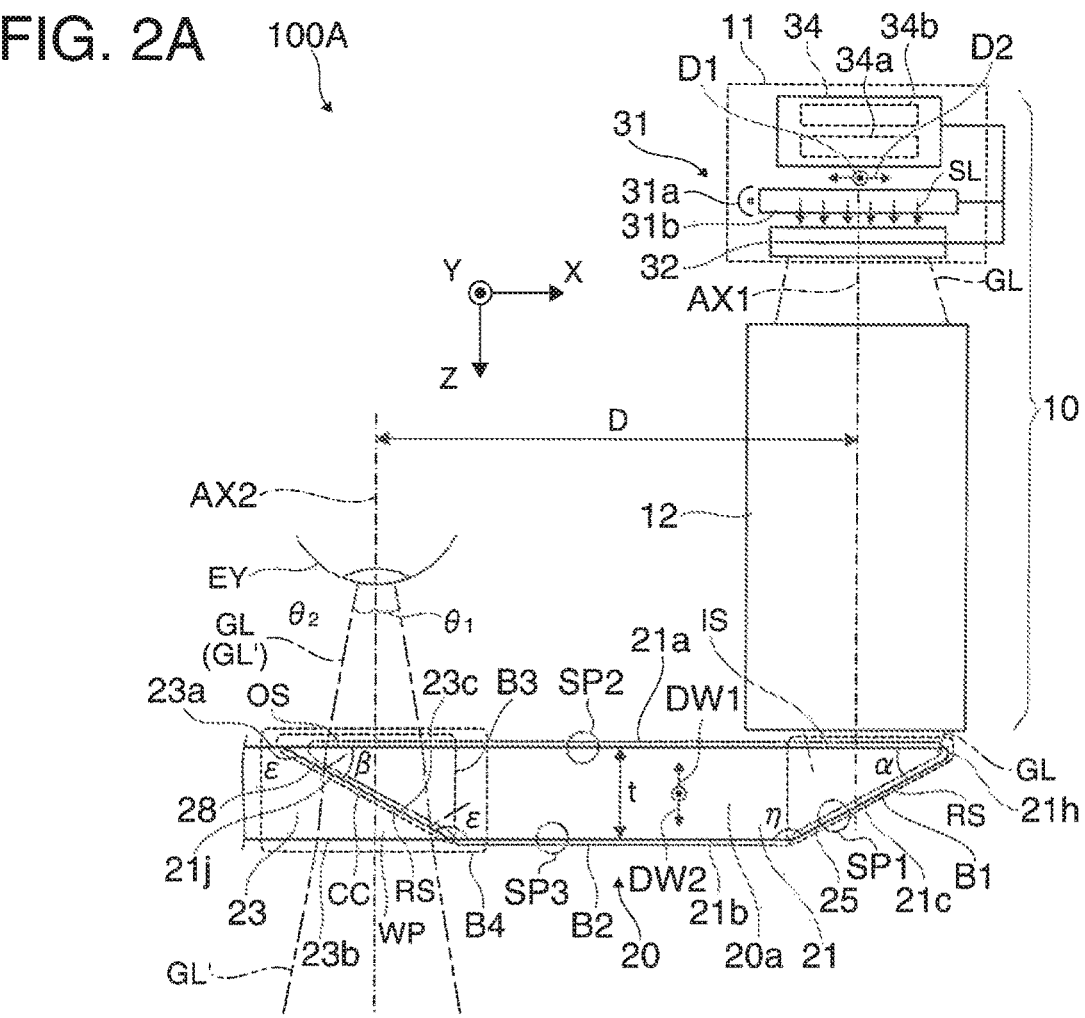
FIG. 2A is a plan view of a body portion of a first display device constituting the virtual image display device.

As shown in FIG. 2A and so on, the first display device 100A is provided with the image forming device 10 and a light guide device 20. Here, the image forming device 10 corresponds to the first drive section 131 shown in FIG. 1, and the light guide device 20 corresponds to the first panel section 111 shown in FIG. 1. It should be noted that the second display device 100B shown in FIG. 1 has a structure similar to the structure of the first display device 100A, which is obtained by simply flipping the structure of the first display device 100A in a lateral direction, and therefore, the detailed explanation of the second display device 100B will be omitted.

The image forming device 10 has an image display device 11 and a projection optical system 12. Among these constituents, the image display device 11 has an illumination device 31 for emitting two-dimensional illumination light SL, a liquid crystal display device 32 as a transmissive spatial light modulation device, and a drive control section 34 for controlling the operations of the illumination device 31 and the liquid crystal display device 32.

The illumination device 31 has a light source 31a for generating light including light components of three colors of red, green, and blue, and a backlight light guide section 31b for diffusing the light from the light source 31a to form a light beam having a rectangular cross-section. The liquid crystal display device 32 spatially modulates the illumination light SL from the illumination device 31 to thereby form the image light to be the display object such as a moving image. The drive control section 34 is provided with a light source drive circuit 34a and a liquid crystal drive circuit 34b. The light source drive circuit 34a supplies the light source 31a of the illumination device 31 with electricity to thereby make it emit the illumination light SL with stable luminance. The liquid crystal drive circuit 34b outputs an image signal or a drive signal to the liquid crystal display device 32 to thereby form the color image light to be an origin of a moving image or a still image in the form of a transmittance pattern. It should be noted that it is possible to provide an image processing function to the liquid crystal drive circuit 34b, and it is also possible to provide the image processing function to an external control circuit. The projection optical system 12 is a collimating lens for converting the image light emitted from each point on the liquid crystal display device 32 into a light beam in a collimated state.

In the liquid crystal display device 32, the first direction D1 corresponds to the vertical Y direction and the second direction D2 corresponds to the horizontal X direction. The first direction D1 and the second direction D2 are perpendicular to a first optical axis AX1 passing through the projection optical system 12, and are perpendicular to each other.

The light guide device 20 is obtained by bonding the light guide member 21 and a light transmitting member 23 to each other, and forming an optical member having a tabular shape extending in parallel to the X-Y plane as a whole.

The light guide member 21 out of the light guide device 20 is a prism-like member having a trapezoidal shape in a plan view, and has a first reflecting surface 21a, a second reflecting surface 21b, a third reflecting surface 21c, and a first junction surface 21j as first through fourth surfaces constituting the side surfaces. Further, the light guide member 21 also has a first side surface 21e and a second side surface 21f opposed to each other and contiguous to the first through third reflecting surfaces 21a, 21b, and 21c, and the first junction surface 21j. Here, the first and second reflecting surfaces 21a, 21b extend along the X-Y plane, and are distant from each other as much as the thickness "t" of the light guide member 21. Further, the third reflecting surface 21c is tilted an acute angle α not larger than 45° with respect to the X-Y plane, and the first junction surface 21j is tilted an acute angle β not larger than 45° with respect to the X-Y plane. In a different point of view, the third reflecting surface 21c has an obtuse angle η with respect to the second reflecting surface 21b, and the first junction surface 21j has an obtuse angle s with respect to the second reflecting surface 21b. The first optical axis AX1 passing through the third reflecting surface 21c and the second optical axis AX2 passing through the first junction surface 21j are disposed in parallel to each other and are distant from each other as much as the distance D. It should be noted that, although the details will be described below, an edge surface 21h is disposed between the first reflecting surface 21a and the third reflecting surface 21c so as to eliminate the ridge. It results that the light guide member 21 has a polyhedral outer shape composed of seven surfaces including the edge surface 21h described above.

The light guide member 21 is for performing light guide using the total reflection by the first and second reflecting surfaces 21a, 21b which are the first and second surfaces extending oppositely each other, and there exist directions to be turned by the reflection in the light guide process, and directions not to be turned by the reflection in the light guide process. When considering the image to be guided by the light guide member 21, the lateral direction to be turned by a plurality of times of reflection in the light guide process, namely a confinement direction DW2, is perpendicular (parallel to the Z axis) to the first and second reflecting surfaces 21a, 21b, and corresponds to the second direction D2 of the liquid crystal display device 32 in the case of developing the light path to the light source side as described later. On the other hand, the vertical direction along which the light propagates without being turned by reflection in the light guide process, namely a nonconfinement direction DW1, is parallel (parallel to the Y axis) to the first and second reflecting surfaces 21a, 21b, and further the third reflecting surface 21c, and corresponds to the first direction D1 of the liquid crystal display device 32 in the case of developing the light path to the light source side as described later. It should be noted that in the light guide member 21, the principal light guide direction along which the light beam propagating therein proceeds as a whole is set to −X direction.

The light guide member 21 is made of a resin material exhibiting high light transmissive property in the visible range. The light guide member 21 has an integrated block-like member molded integrally by injection molding as a body portion 20a, and the body portion (the integrated member) 20a is formed by, for example, injecting a thermal or photochemical polymerization resin material inside the molding die and then causing thermal cure or light cure therein. Although the light guide member 21 has the body portion 20a as a base member formed of an integral-molding product as described above, it is possible to functionally divide it into a light entrance section B1, a light guide section B2, and a light exit section B3.

The light entrance section B1 is a part having a triangular prism shape, and has a light entrance surface IS as a part of the first reflecting surface 21a, and the third reflecting surface 21c opposed to the light entrance surface IS. The light entrance surface IS is a plane for taking in the image light GL from the image forming device 10 and located on the reverse side or the observer side, and extends perpendicularly to the first optical axis AX1 of the projection optical system 12 so as to be opposed to the projection optical system 12. The third reflecting surface 21c has a rectangular outline, and has a mirror layer 25, which is a reflecting mirror for reflecting the image light GL having passed through the light entrance surface IS to thereby guide it inside the light guide section B2, throughout the roughly entire area inside the rectangular outline. The mirror layer 25 is formed by performing deposition on a tilted surface RS of the light guide member 21 using evaporation of aluminum or the like.

Figure 3A:
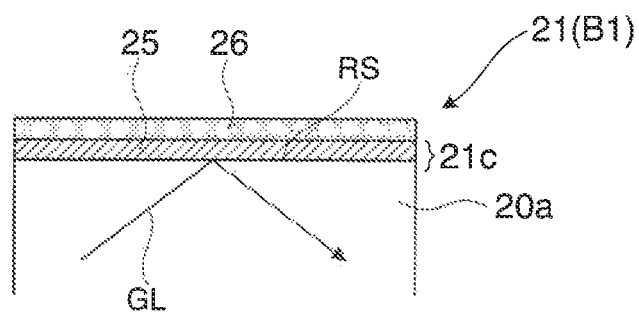
FIG. 3A is a diagram for explaining a structure of a third reflecting surface in a light entrance section of a light guide member.

FIG. 3A is a diagram for explaining the third reflecting surface 21c, and is a partial enlarged cross-sectional view of a surface portion SP1 in the light entrance section B1. The third reflecting surface 21c has a mirror layer 25, and is covered by a protective layer 26. The mirror layer 25 is a total reflection coating, and is formed by performing deposition on a tilted surface RS of the body portion 20a constituting the light guide member 21 using evaporation of Al (aluminum) or the like.

Returning to FIG. 2A and so on, the third reflecting surface 21c is tilted, for example, at an acute angle α of 25° through 27° with respect to the first optical axis AX1 of the projection optical system 12 or the X-Y plane, and folds the image light GL, which enters from the light entrance surface IS and then proceeds in the +Z direction as a whole, so as to proceed in the −X direction shifted to the −Z direction as a whole, to thereby surely couple the image light GL on the inside of the light guide section B2. It should be noted that it is also possible to form a hard coat layer in advance as a foundation of the mirror layer 25.

The light guide section B2 has the first reflecting surface 21a and the second reflecting surface 21b, each of which totally reflects the image light deflected by the light entrance section B1, as a pair of planes opposed to each other and extending in parallel to the X-Y plane. The distance between the first and second reflecting surfaces 21a, 21b, namely the thickness t of the light guide member 21, is set to, for example, about 9 mm. It is assumed here that the first reflecting surface 21a is located on the reverse side or the observer side near to the image forming device 10, and the second reflecting surface 21b is located on the obverse side or the external side far from the image forming device 10. In this case, the surface portion of the first reflecting surface 21a is common to the light entrance surface IS described above and the light exit surface OS described later. The first and second reflecting surfaces 21a, 21b are each a total reflection surface using the refractive index difference, and no non-transmissive reflecting coat such as a mirror layer is provided to the surfaces thereof.

Figure 3B:
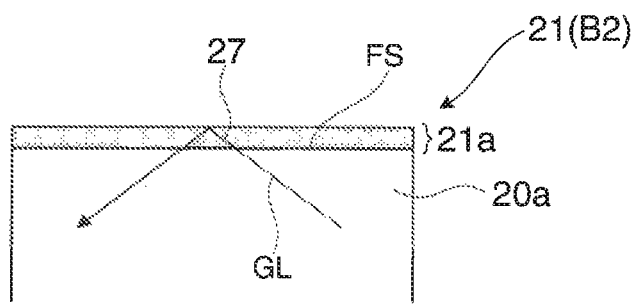
FIG. 3B is a diagram for explaining a structure of a first reflecting surface in a light guide section of the light guide member.
Figure 3C:
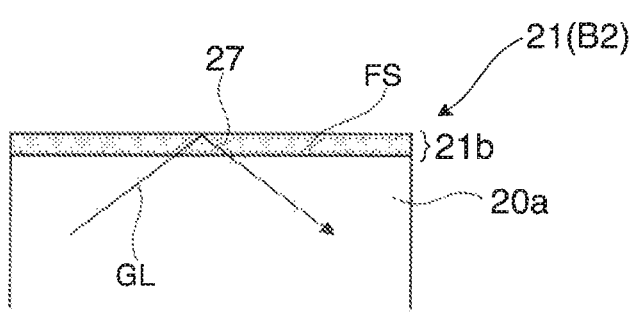
FIG. 3C is a diagram for explaining a structure of a second reflecting surface in the light guide section of the light guide member.

FIG. 3B is a diagram for explaining the first reflecting surface 21a, and is a partial enlarged cross-sectional view of a surface portion SP2 in the light guide section B2 of the light guide member 21. Further, FIG. 3C is a diagram for explaining the second reflecting surface 21b, and is a partial enlarged cross-sectional view of a surface portion SP3 in the light guide section B2 of the light guide member 21. The first and second reflecting surfaces 21a, 21b are covered by a hard coat layer 27 in order to prevent damages of the surfaces to thereby prevent degradation in resolution of the picture. The hard coat layer 27 is formed by depositing a coating agent made of resin or the like on a flat surface FS of the body portion 20a of the light guide member 21 using a dipping process or a spray coating process.

Returning to FIG. 2A, the image light GL having been reflected by the third reflecting surface 21c of the light entrance section B1 firstly enters the first reflecting surface 21a of the light guide section B2, and is then totally reflected. Subsequently, the image light GL enters the second reflecting surface 21b, and is then totally reflected. By subsequently repeating the actions described above, the image light is guided in a principal light guide direction on the back side of the light guide device 20, namely to the −X side where the light exit section B3 is disposed, as a whole. It should be noted that since the first and second reflecting surfaces 21a, 21b are not provided with the non-transmissive or semi-transmissive reflection coat, the external light or the outside light externally entering the second reflecting surface 21b passes through the light guide section B2 at a high transmittance. In other words, the light guide section B2 is arranged to be a see-through type through which the external image can be seen.

The light exit section B3 is a part having a triangular prism shape, and has a light exit surface OS as a part of the first reflecting surface 21a, and the first junction surface 21j opposed to the light exit surface OS. The light exit surface OS is a reverse side plane for emitting the image light GL toward the eye EY of the observer, and forms a part of the first reflecting surface 21a similarly to the case of the light entrance surface IS, and extends perpendicularly to the second optical axis AX2. The distance D between the second optical axis AX2 passing through the light exit section B3 and the first optical axis AX1 passing through the light entrance section B1 is set to, for example, 50 mm taking the width of the head of the observer and so on into consideration. The first junction surface 21j is a roughly rectangular tilted flat surface (a tilted surface RS), and a part thereof is provided with a fourth reflecting surface 21d for reflecting the image light GL, which has entered there via the first and second reflecting surfaces 21a, 21b, to thereby emit it to the outside of the light exit section B3.

The fourth reflecting surface 21d has a half mirror layer 28. The half mirror layer 28 is a reflecting film (i.e., a semi-transmissive reflecting film) having a light transmissive property. The half mirror layer (the semi-transmissive reflecting film) 28 is formed on a partial area PA0 of the first junction surface 21j rather than the entire first junction surface 21j. The partial area PA0 to be provided with the half mirror layer 28 out of the first junction surface 21j is disposed on a central side with respect to the non-confinement direction DW1 as the vertical direction, and is sandwiched by a pair of peripheral areas PA1, PA2 on both of the upper and lower ends. Further, on the −X side of the partial area PA0, there exists a back side area PA3 not provided with the half mirror layer 28. An exceptional area PA composed of these peripheral areas PA1, PA2, and the back side area PA3 collected with each other is an area where the half mirror layer 28 as the fourth reflecting surface 21d does not exist, and transmits the image light GL and so on with no substantial change. The half mirror layer 28 is formed by depositing a metal reflecting film or a dielectric multilayer film on the partial area PA0 out of the first junction surface 21j of the body portion 20a constituting the light guide member 21. The reflectance of the half mirror layer 28 with respect to the image light GL is set to be not lower than 10% and not higher than 50% in the assumed incident angle range of the image light GL from the view point of making the see-through observation of the external light GL' easy. The reflectance of the half mirror layer 28 with respect to the image light GL in a specific example is set to, for example, 20%, and the transmittance with respect to the image light GL is set to, for example, 80%.

Figure 3D:
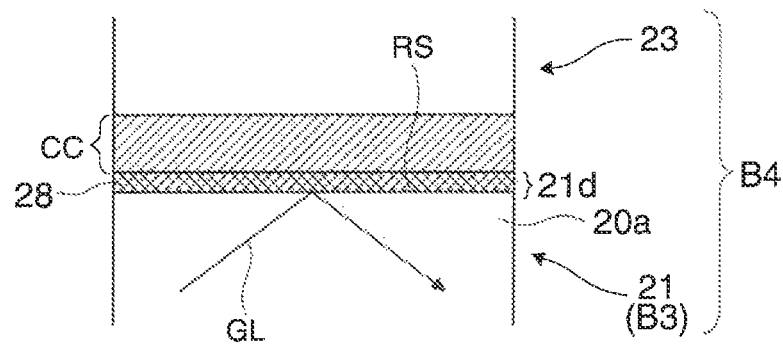
FIG. 3D is a diagram for explaining a structure of a fourth reflecting surface in a light exit section of the light guide member.

FIG. 3D is a diagram for explaining a structure of the fourth reflecting surface 21d and the periphery thereof. Here, between the fourth reflecting surface 21d of the light guide member 21 and the second junction surface 23c of the light transmitting member 23, more precisely between the half mirror layer 28 and the second junction surface 23c, there is formed a bonding layer CC with an adhesive for bonding the light guide member 21 and the light transmitting member 23. The bonding layer CC has the refractive index roughly equal to those of the body portion 20a of the light guide member 21 and a bulk material of the light transmitting member 23 to thereby prevent the light passing through the light guide member 21, the light transmitting member 23, and the interfaces between these members and the bonding layer CC from the light guide member 21 to the light transmitting member 23 from being unnecessarily reflected by the interfaces.

Returning to FIG. 2A and so on, the fourth reflecting surface 21d or the first junction surface 21j is tilted, for example, at an acute angle α of 25° through 27° with respect to the second optical axis AX2 perpendicular to the first reflecting surface 21a or the X-Y plane, and the image light GL, which has entered there via the first and second reflecting surfaces 21a, 21b of the light guide section B2, is partially reflected to thereby deflect it so as to proceed toward the −Z direction as a whole using the half mirror layer 28 described above, and is thus transmitted through the light exit surface OS. It should be noted that the component of the image light transmitted through the fourth reflecting surface 21d enters the light transmitting member 23, and is not used for forming the picture.

Figure 2B:
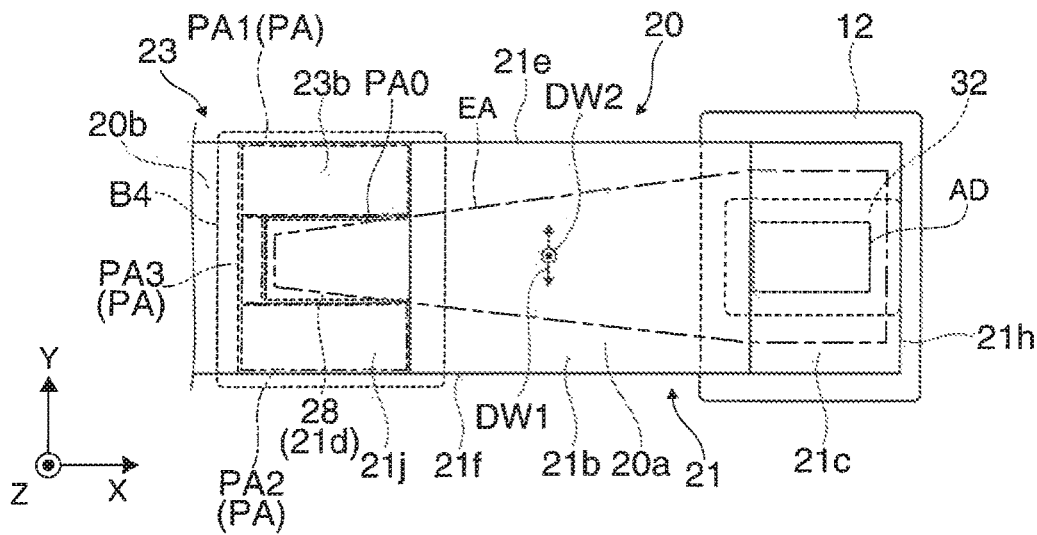
FIG. 2B is a front view of the body portion.

As shown in FIG. 2B, an effective area EA through which the image light GL is transmitted out of the light guide member 21 has a vertically long shape in comparison on the light entrance section B1 side, and has a horizontally long shape in comparison on the light exit section B3 side. The fourth reflecting surface 21d or the half mirror layer 28 is a part of the first junction surface 21j, but is formed so as to correspond to the effective area EA of the image light GL, and covers the effective area EA, and the image light GL guided by the light guide member 21 passes through the light entrance section B1 without loss, and then enters the eye EY of the observer. As described above, the half mirror layer 28 has a horizontally long contour, but is arranged to correspond to the horizontally long contour of an image forming area AD of the liquid crystal display device 32.

The light transmitting member 23 is formed of the same material as that of the body portion 20a of the light guide member 21 to thereby have the same refractive index as that of the body portion 20a, and has a first surface 23a, a second surface 23b, and the second junction surface 23c. The first and second surfaces 23a, 23b extend along the X-Y plane. Further, the second junction surface 23c is tilted with respect to the X-Y plane, and is disposed so as to be opposed in parallel to the first junction surface 21j or the fourth reflecting surface 21d of the light guide member 21. In other words, the light transmitting member 23 is arranged to have a member WP having a wedge shape sandwiched between the second surface 23b and the second junction surface 23c. The light transmitting member 23 is formed of a resin material exhibiting high light transmissive property in the visible range similarly to the light guide member 21. The light transmitting member 23 is a block-like integrated member formed by an injection molding process, and is formed by, for example, injecting a thermal or photochemical polymerization resin material inside the molding die and then causing thermal cure or light cure therein.

In the light transmitting member 23, the first surface 23a is disposed on an extended plane of the first reflecting surface 21a provided to the light guide member 21, and is located on the reverse side near to the eye EY of the observer, and the second surface 23b is disposed on an extended plane of the second reflecting surface 21b provided to the light guide member 21, and is located on the obverse side far from the eye EY of the observer. The second junction surface 23c is a rectangular light transmitting surface to be bonded to the first junction surface 21j of the light guide member 21 with an adhesive. The angle formed between the first surface 23a and the second junction surface 23c described above is arranged to be equal to the angle s formed between the second reflecting surface 21b and the first junction surface 21j of the light guide member 21, and the angle formed between the second surface 23b and the second junction surface 23c is arranged to be equal to the angle β formed between the first reflecting surface 21a and the third reflecting surface 21c of the light guide member 21.

The light transmitting member 23 and the light guide member 21 constitute a see-through section B4 in the junction section of the both members and the vicinity thereof. Specifically, the first and second surfaces 23a, 23b are not provided with a reflection coat such as a mirror layer, and therefore, transmit the external light GL' at a high transmittance similarly to the light guide section B2 of the light guide member 21. Although the second junction surface 23c can also transmit the external light GL' at a high transmittance, since the half mirror layer 28 exists in an area corresponding to the fourth reflecting surface 21d of the light guide member 21, the external light GL' passing through the second junction surface 23c fades, for example, by 20%. In other words, it results that the observer observes the light obtained by overlapping the image light GL having faded to 20% and the external light GL' having faded to 80%.

C. General Outline of Light Path of Image Light

Figure 4A:
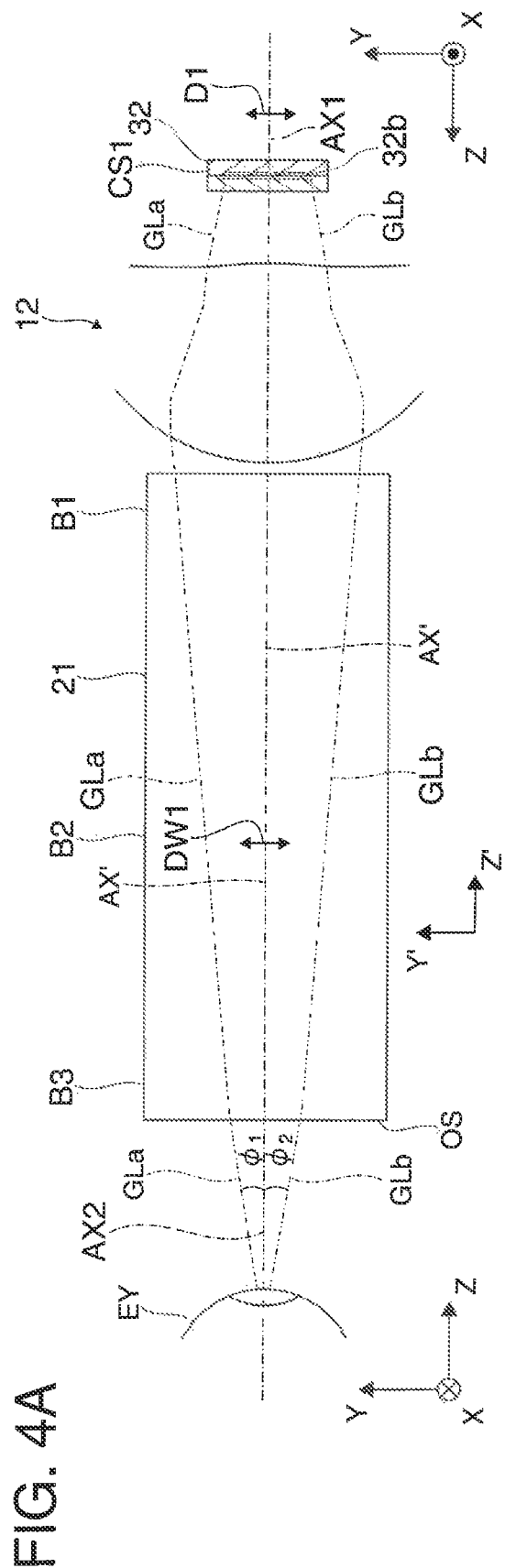
FIG. 4A is a conceptual diagram of developing a light path with respect to a vertical first direction.

FIG. 4A is a diagram for explaining the light path in the first direction D1 corresponding to a vertical cross-sectional surface CS1 of the liquid crystal display device 32. In the vertical cross-sectional surface along the first direction D1, namely the Y-Z plane (the Y'-Z' plane after the development), out of the image light having been emitted from the liquid crystal display device 32, a component emitted from an upper end side (+Y side) of the display area 32b indicated by the dashed-dotted line in the drawing is referred to as image light GLa, and a component emitted from the lower end side (−Y side) of the display area 32b indicated by the dashed-two dotted line in the drawing is referred to as image light GLb.

The image light GLa on the upper side is converted by the projection optical system 12 into a parallel light beam, and enters the eye EY of the observer along the developed optical axis AX' through the light entrance section B1, the light guide section B2, and the light exit section B3 of the light guide member 21 in a state of the parallel light beam from above at an angle $\phi_1$ in a tilted manner. On the other hand, the image light GLb on the lower side is converted by the projection optical system 12 into a parallel light beam, and enters the eye EY of the observer along the developed optical axis AX' through the light entrance section B1, the light guide section B2, and the light exit section B3 of the light guide member 21 in a state of the parallel light beam from beneath at an angle $\phi_2$ ($|\phi_2|=|\phi_1|$) in a tilted manner. The angles $\phi_1$, $\phi_2$ described above correspond respectively to upper and lower half field angles, and are set to, for example, 6.5°.

Figure 4B:
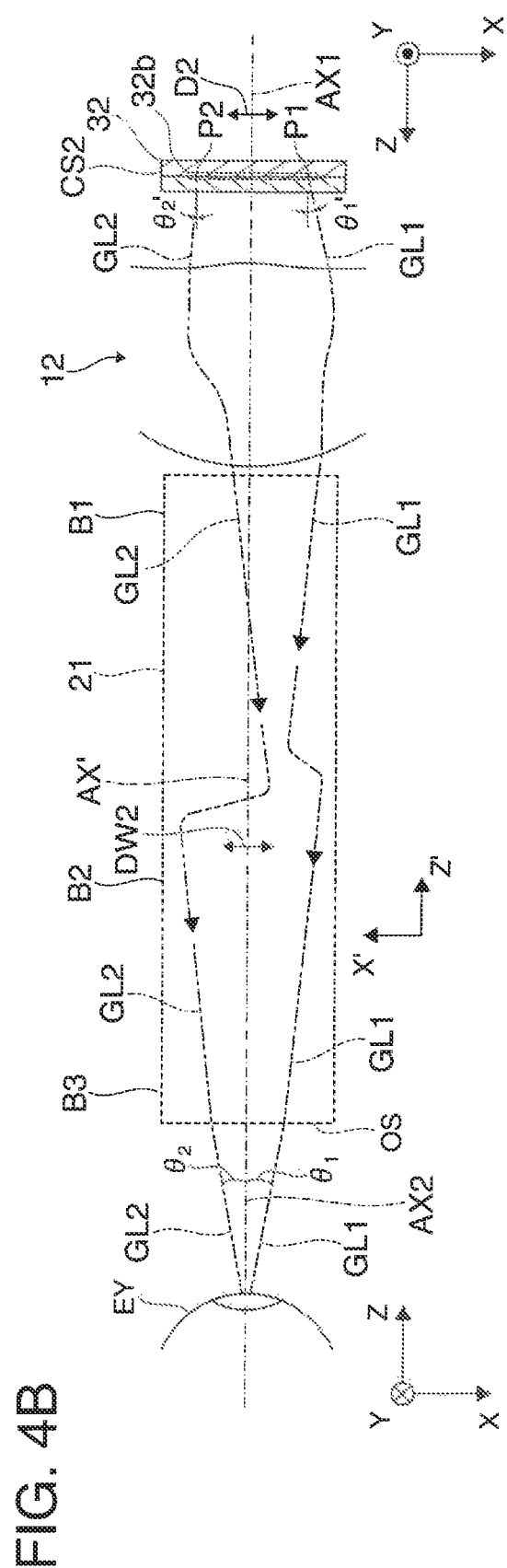
FIG. 4B is a conceptual diagram of developing a light path with respect to a lateral second direction.

FIG. 4B is a diagram for explaining the light path in the second direction D2 corresponding to a horizontal cross-sectional surface CS2 of the liquid crystal display device 32. In the horizontal cross-sectional surface CS2 along the second direction D2, namely the X-Z plane (the X'-Z' plane after the development), out of the image light having been emitted from the liquid crystal display device 32, a component emitted from a first display point P1 on the right end side (+X side) toward the display area 32b indicated by the dashed-dotted line in the drawing is referred to as image light GL1, and a component emitted from a second display point P2 on the left end side (−X side) toward the display area 32b indicated by the dashed-two dotted line in the drawing is referred to as image light GL2.

The image light GL1 from the first display point P1 on the right side is converted by the projection optical system 12 into a parallel light beam, and enters the eye EY of the observer along the developed optical axis AX' through the light entrance section B1, the light guide section B2, and the light exit section B3 of the light guide member 21 in a state of the parallel light beam from the right at an angle $\theta_1$ in a tilted manner. Meanwhile, the image light GL2 from the second display point P2 on the left side is converted by the projection optical system 12 into a parallel light beam, and enters the eye EY of the observer along the developed optical axis AX' through the light entrance section B1, the light guide section B2, and the light exit section B3 of the light guide member 21 in a state of the parallel light beam from the left at an angle $\theta_2$ ($|\theta_2|=|\theta_1|$) in a tilted manner. The angles $\theta_1$, $\theta_2$ described above correspond respectively to right and left half field angles, and are set to, for example, 10°.

It should be noted that regarding the lateral direction of the second direction D2 or the confinement direction DW2, since the image lights GL1, GL2 are turned in the light guide member 21 by reflection, and the number of times of reflection is different therebetween, each of the image lights GL1, GL2 is expressed in the light guide member 21 in a discontinuous manner. Further, regarding the eye EY of the observer, the viewing direction is flipped vertically compared to the case shown in FIG. 2A. As a result, although the screen is flipped horizontally as a whole regarding the lateral direction, the right half image of the liquid crystal display device 32 and the left half image of the liquid crystal display device 32 become continuously connected to each other without a displacement by processing the light guide member 21 with high accuracy as described later in detail. It should be noted that the emission angle $\theta_1'$ of the image light GL1 on the right side and the emission angle $\theta_2'$ of the image light GL2 on the left side are set differently taking the fact that the both image lights GL1, GL2 are different from each other in the number of times of reflection in the light guide member 21 into consideration.

According to the configuration described above, the image lights GLa, GLb, GL1, and GL2 entering the eye EY of the observer are arranged to be the virtual image from infinity, the picture formed on the liquid crystal display device 32 is erected with respect to the vertical first direction D1 or the non-confinement direction DW1, and the picture formed on the liquid crystal display device 32 is inverted with respect to the horizontal second direction D2 or the confinement direction DW2.

D. Light Path of Image Light Regarding Lateral Direction

Figure 5:
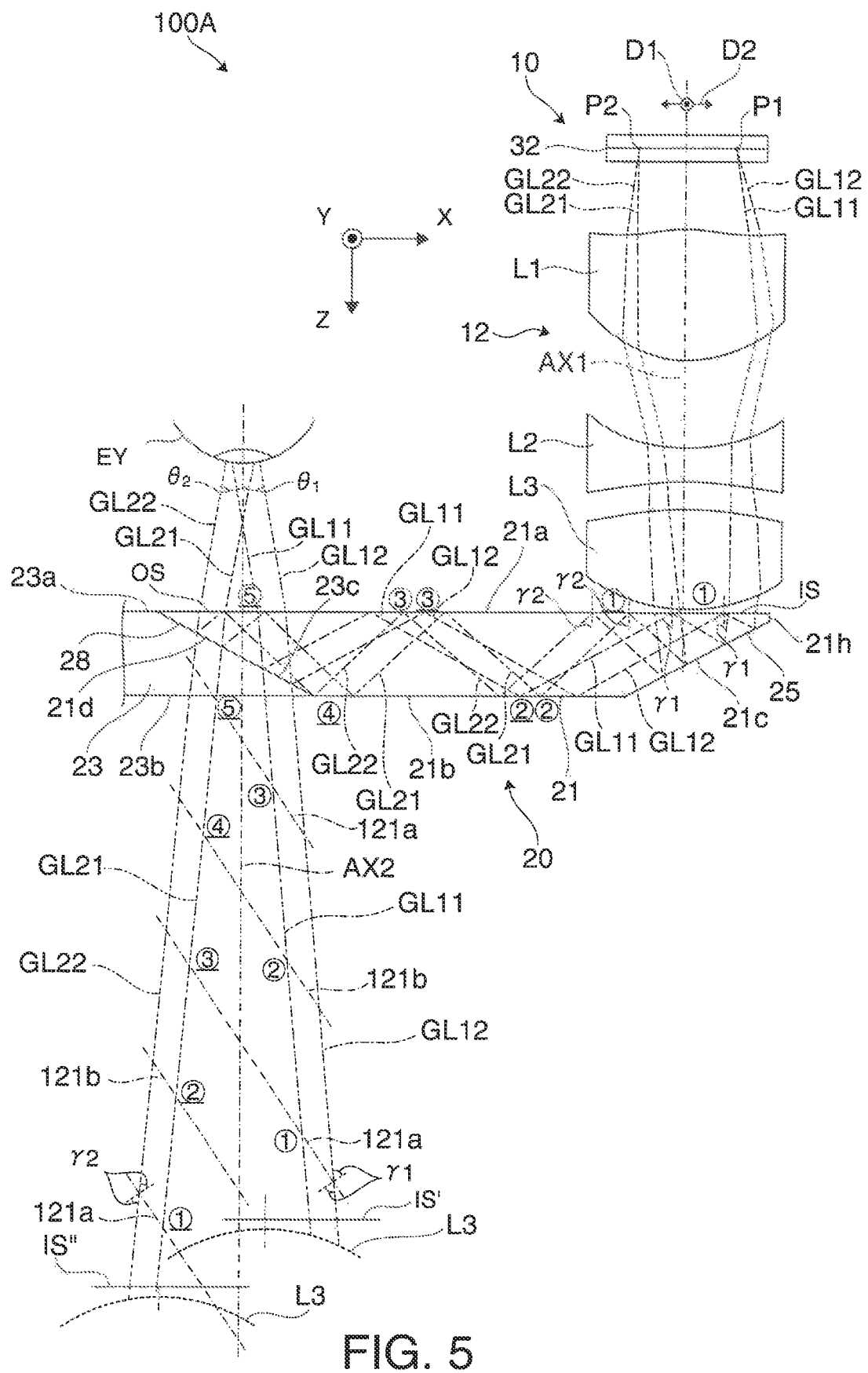
FIG. 5 is a plan view for specifically explaining the light path in an optical system of the virtual image display device.

FIG. 5 is a cross-sectional view for explaining the specific light path in the first display device 100A. The projection optical system 12 has three lenses L1, L2, and L3.

Image lights GL11, GL12 from the first display point P1 on the right side of the liquid crystal display device 32 are converted into a parallel light beam by passing through the lenses L1, L2, and L3 of the projection optical system 12, and then enter the light entrance surface IS of the light guide member 21. The image lights GL11, GL12 guided into the light guide member 21 repeat total reflection on the first and second reflecting surfaces 21a, 21b at the same angle, and are finally emitted from the light exit surface OS as a parallel light beam. Specifically, the image lights GL11, GL12 are reflected by the third reflecting surface 21c of the light guide member 21 as a parallel light beam, then enter the first reflecting surface 21a of the light guide member 21 at a first reflection angle γ1, and are then totally reflected (first total reflection). Subsequently, the image lights GL11, GL12 enter the second reflecting surface 21b to be totally reflected (second total reflection), and then enter the first reflecting surface 21a again to be totally reflected (third total reflection) in the state of keeping the first reflection angle γ1. As a result, the image lights GL11, GL12 are totally reflected by the first and second reflecting surfaces 21a, 21b three times in total, and then enter the fourth reflecting surface 21d. The image lights GL11, GL12 are reflected by the fourth reflecting surface 21d at an angle equal to the angle with respect to the third reflecting surface 21c, and are then emitted from the light exit surface OS at an angle $\theta_1$ with respect to the direction of the second optical axis AX2 perpendicular to the light exit surface OS as the parallel light beam.

Image lights GL21, GL22 from the second display point P2 on the left side of the liquid crystal display device 32 are converted into a parallel light beam by passing through the lenses L1, L2, and L3 of the projection optical system 12, and then enter the light entrance surface IS of the light guide member 21. The image lights GL21, GL22 guided into the light guide member 21 repeat total reflection on the first and second reflecting surfaces 21a, 21b at the same angle, and are finally emitted from the light exit surface OS as a parallel light beam. Specifically, the image lights GL21, GL22 are reflected by the third reflecting surface 21c of the light guide member 21 as a parallel light beam, then enter the first reflecting surface 21a of the light guide member 21 at a second reflection angle γ2 (γ2<γ1), and are then totally reflected (first total reflection). Subsequently, the image lights GL21, GL22 enter the second reflecting surface 21b to be totally reflected (second total reflection), then enter the first reflecting surface 21a again to be totally reflected (third total reflection), then enter the second reflecting surface 21b again to be totally reflected (fourth total reflection), and then enter the first reflecting surface 21a again to be totally reflected (fifth total reflection) in the state of keeping the second reflection angle γ2. As a result, the image lights GL21, GL22 are totally reflected on the first and second reflecting surfaces 21a, 21b five times in total, and then enter the fourth reflecting surface 21d. The image lights GL21, GL22 are reflected by the fourth reflecting surface 21d at an angle equal to the angle with respect to the third reflecting surface 21c, and are then emitted from the light exit surface OS at an angle $\theta_2$ with respect to the direction of the second optical axis AX2 perpendicular to the light exit surface OS as the parallel light beam.

In FIG. 5, there are drawn an imaginary first surface 121a corresponding to the first reflecting surface 21a when developing the light guide member 21, and an imaginary second surface 121b corresponding to the second reflecting surface 21b when developing the light guide member 21. By developing the light guide member 21 as described above, it is understood that the image lights GL11, GL12 from the first display point P1 pass through an entrance equivalent surface IS' corresponding to the light entrance surface IS, then pass through the first surface 121a twice and the second surface 121b once, and are then emitted from the light exit surface OS to thereby enter the eye EY of the observer, and the image lights GL21, GL22 from the second display point P2 pass through an entrance equivalent surface IS'' corresponding to the light entrance surface IS, then pass through the first surface 121a three times and the second surface 121b twice, and are then emitted from the light exit surface OS to thereby enter the eye EY of the observer. In a different point of view, it results that the observer makes the observation while making the lenses L3 of the projection optical system 12, which exist in the vicinities of the two entrance equivalent surfaces IS', IS'' located differently from each other, overlap each other.

Figure 6A:
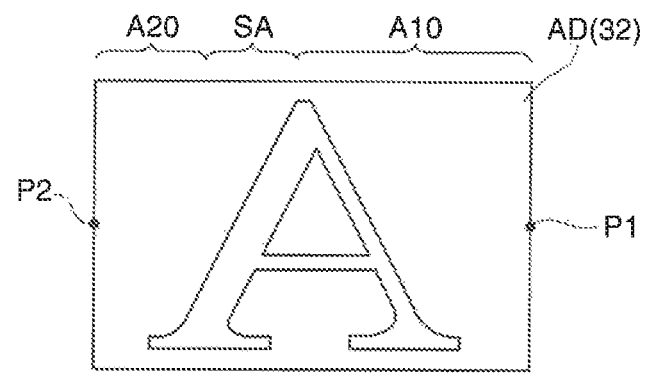
FIG. 6A is a diagram showing a display surface of a liquid crystal display device.
Figure 6B:
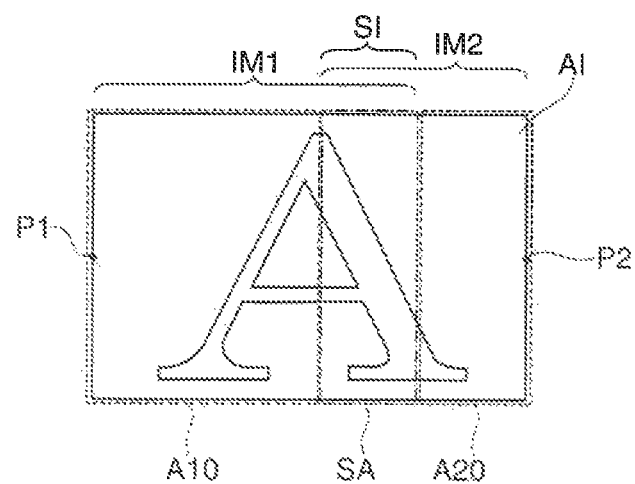
FIG. 6B is a diagram for conceptually explaining the virtual image of the liquid crystal display device viewed by the observer.
Figure 6C:
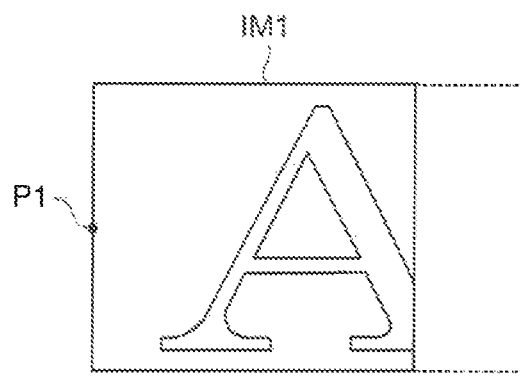
FIGS. 6C and 6D are diagrams for explaining partial images constituting the virtual image.
Figure 6D:
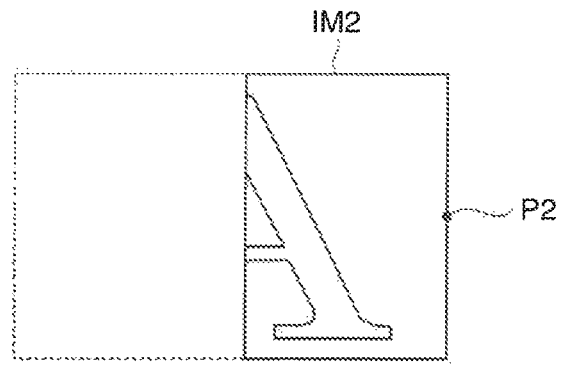

FIG. 6A is a diagram for conceptually explaining a display surface of the liquid crystal display device 32, FIG. 6B is a diagram for conceptually explaining the virtual image of the liquid crystal display device 32 viewed by the observer, and FIGS. 6C and 6D are diagrams for explaining partial images constituting the virtual image. A rectangular image forming area AD provided to the liquid crystal display device 32 shown in FIG. 6A is observed as a virtual image display area AI shown in FIG. 6B. In the left part of the virtual image display area AI, there is formed a first projection image IM1 corresponding to a part located in a range from the center to the right side of the image forming area AD of the liquid crystal display device 32, and the first projection image IM1 is formed as a partial image lacking the right part as shown in FIG. 6C. Further, in the right part of the virtual image display area AI, a second projection image IM2 corresponding to a part located in a range from the center to the left side of the image forming area AD of the liquid crystal display device 32 is formed as a virtual image, and the second projection image IM2 is formed as a partial image lacking the left part as shown in FIG. 6D.

A first partial area A10 for forming only the first projection image (the virtual image) IM1 out of the liquid crystal display device 32 shown in FIG. 6A includes, for example, the first display point P1 at the right end of the liquid crystal display device 32, and emits the image lights GL11, GL12 to be totally reflected in the light guide section B2 of the light guide member 21 three times in total. A second partial area A20 for forming only the second projection image (the virtual image) IM2 out of the liquid crystal display device 32 includes, for example, the second display point P2 at the left end of the liquid crystal display device 32, and emits the image lights GL21, GL22 to be totally reflected in the light guide section B2 of the light guide member 21 five times in total. The image light from a band SA sandwiched by the first and second partial areas A10, A20 in the central area of the image forming area AD of the liquid crystal display device 32, and extending to form a vertically long shape forms an overlapping image SI shown in FIG. 6B. In other words, it results that the image light from the band SA of the liquid crystal display device 32 forms the first projection image IM1 formed by the image lights GL11, GL12 totally reflected in the light guide section B2 three times in total and the second projection image IM2 formed by the image lights GL21, GL22 totally reflected in the light guide section B2 five times in total, and the projection images IM1, IM2 overlap each other on the virtual image display area AI. If the processing of the light guide member 21 is precise and the light beam accurately collimated is formed by the projection optical system 12, the displacement and blur due to the overlap of the two projection images IM1, IM2 can be prevented with respect to the overlapping image SI.

E. Junction of Light Guide Member and Light Transmitting Member

Figure 7:
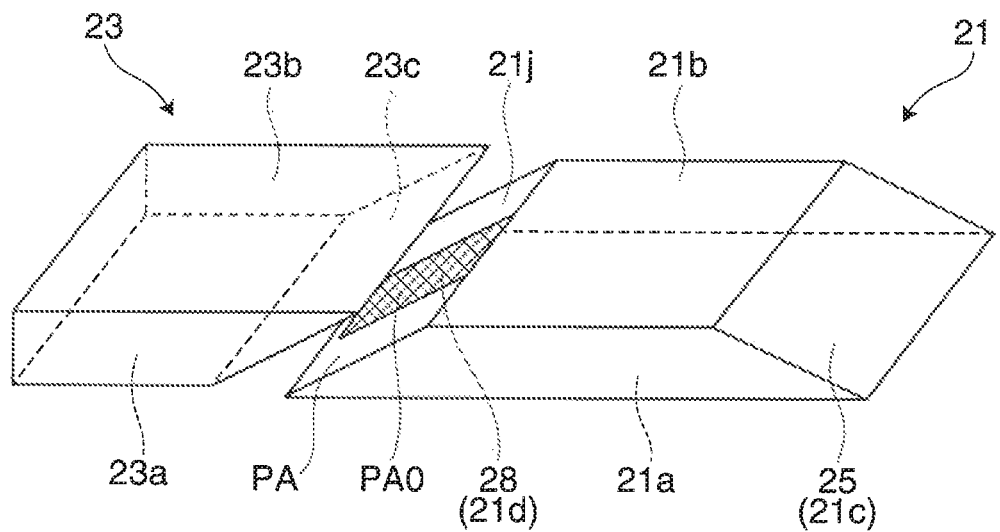
FIG. 7 is a perspective view for explaining a bonding process between the light guide member and a light transmissive member.

As shown in FIG. 7, when bonding the light guide member 21 and the light transmitting member 23 to each other, the half mirror layer 28 is formed in advance on the partial area PA0 in the first junction surface 21j of the light guide member 21. Subsequently, an ultraviolet curable adhesive, for example, is applied on the half mirror layer 28 and the exceptional area PA in the periphery thereof, and is then spread. Further, the second junction surface 23c of the light transmitting member 23 is disposed so as to face the half mirror layer 28 and the exceptional area PA, and then the curing light as the ultraviolet light is applied between the first and second junction surfaces 21j, 23c while pressing them with an appropriate force. Thus, the adhesive between the first and second junction surfaces 21j, 23c cures to thereby complete the bonding between the light guide member 21 and the light transmitting member 23. On this occasion, since not only the space between the half mirror layer 28 and the second junction surface 23c but also the space between the exceptional area PA and the second junction surface 23c are filled with the adhesive, and the bonding layer CC is formed by the curing of the adhesive (see FIG. 3D), the bonding strength between the light guide member 21 and the light transmitting member 23 increases.

Figure 8:
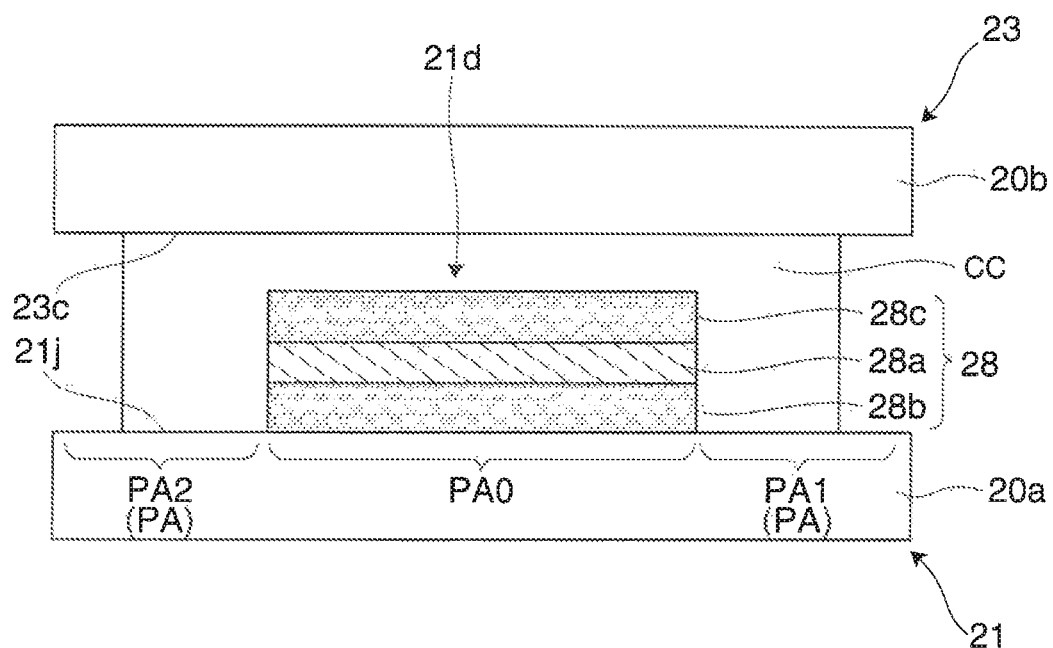
FIG. 8 is an enlarged cross-sectional view for conceptually explaining a junction section between the light guide member and the light transmissive member.

FIG. 8 is an enlarged cross-sectional view for conceptually explaining the junction section between the light guide member 21 and the light transmitting member 23. The body portion 20a of the light guide member 21 and the body portion 20b of the light transmitting member 23 are coupled on each other by the bonding layer CC formed between the first and second junction surfaces 21j, 23c. Here, regarding the exceptional area PA in the periphery, the first and second junction surfaces 21j, 23c with mirrored surfaces are directly bonded to each other via the bonding layer CC, and therefore, the necessary bonding strength can be provided with relative ease. In contrast, regarding the partial area PA0 in the central portion, since the half mirror layer 28 exists between the first junction surface 21j and the bonding layer CC, and the half mirror layer 28 is formed by evaporation coating and provides relatively weak attachment force, it is relatively difficult to provide the necessary bonding strength. As a result, the light guide member 21 and the light transmitting member 23 are tightly bonded to each other mainly in the exceptional area PA in the periphery, and thus the sufficiently high strength of the light guide device 20 composed of the light guide member 21 and the light transmitting member 23 can be obtained.

It should be noted that the half mirror layer (semi-transmissive reflecting film) 28 shown in the drawing is arranged to have a sandwich structure having a metal reflecting film 28a, a first dielectric multilayer film 28b, and a second dielectric multilayer film 28c stacked so that the metal reflecting film 28a comes the center. The metal reflecting film 28a is formed of a material such as Ag or Al. The first dielectric multilayer film 28b on the lower side and the second dielectric multilayer film 28c on the upper side are each a film formed by laminating, for example, more than a few transparent dielectric layers, and improve the angular characteristic and so on of the metal reflecting film 28a. It should be noted that these dielectric multilayer films 28b, 28c can also be eliminated.

According to the virtual image display device 100 of the embodiment described above, since the half mirror layer (the semi-transmissive reflecting film) 28 of the light guide member 21 is formed on the partial area PA0 of the first junction surface 21j, and the second junction surface 23c of the light transmitting member 23 is tightly bonded to the first junction surface 21j in at least the exceptional area PA in the light guide device 20, it is possible to increase the bonding strength of the first junction surface 21j and the second junction surface 23c, namely the strength of the light guide device 20 composed of the light guide member 21 and the light transmitting member 23 combined with each other even in the case in which the attachment force of the half mirror layer (the semi-transmissive reflecting film) 28 with respect to the first junction surface 21j is not sufficiently strong.

Although it is assumed hereinabove that the number of times of total reflection of the image lights GL11, GL12 emitted from the first partial area A10 including the first display point P1 on the right side of the liquid crystal display device 32 by the first and second reflecting surfaces 21a, 21b is three in total, and the number of times of total reflection of the image lights GL21, GL22 emitted from the second partial area A20 including the second display point P2 on the left side of the liquid crystal display device 32 by the first and second reflecting surfaces 21a, 21b is five in total, the numbers of times of total reflection can arbitrarily be changed. Specifically, it is also possible to set the number of times of total reflection of the image lights GL11, GL12 to five in total and to set the number of times of total reflection of the image lights GL21, GL22 to seven in total by adjusting the outer shape (i.e., the thickness t, the distance D, and the acute angles α, β) of the light guide member 21. Further, although it is assumed hereinabove that the numbers of times of total reflection of the image lights GL11, GL12, GL21, and GL22 are odd numbers, if the light entrance surface IS and the light exit surface OS are disposed on the respective sides opposite to each other, namely if the light guide member 21 is formed to have a parallelogram shape in a plane view, the numbers of times of total reflection of the image lights GL11, GL12, GL21, and GL22 are even numbers.

Figure 9A:
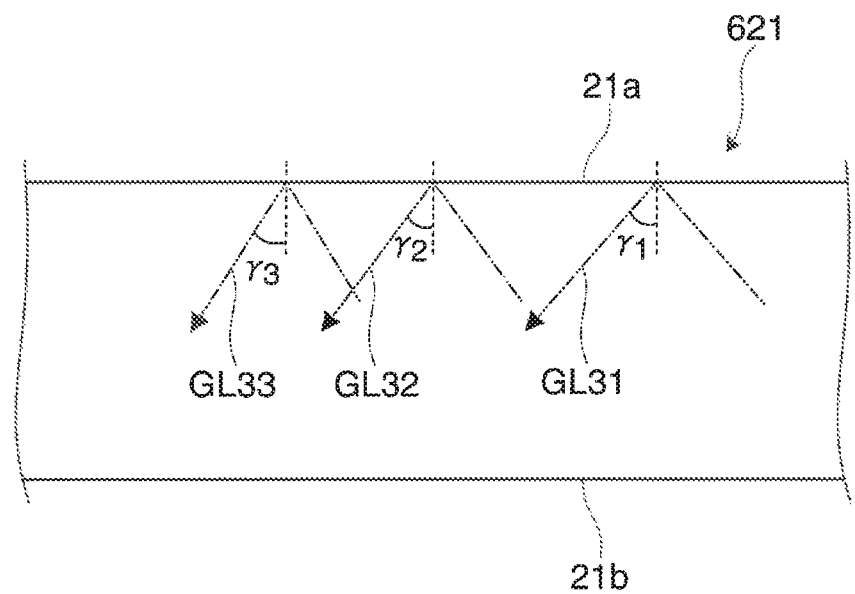
FIGS. 9A and 9B are diagrams for explaining a part of a virtual image display device according to a modified example.
Figure 9B:
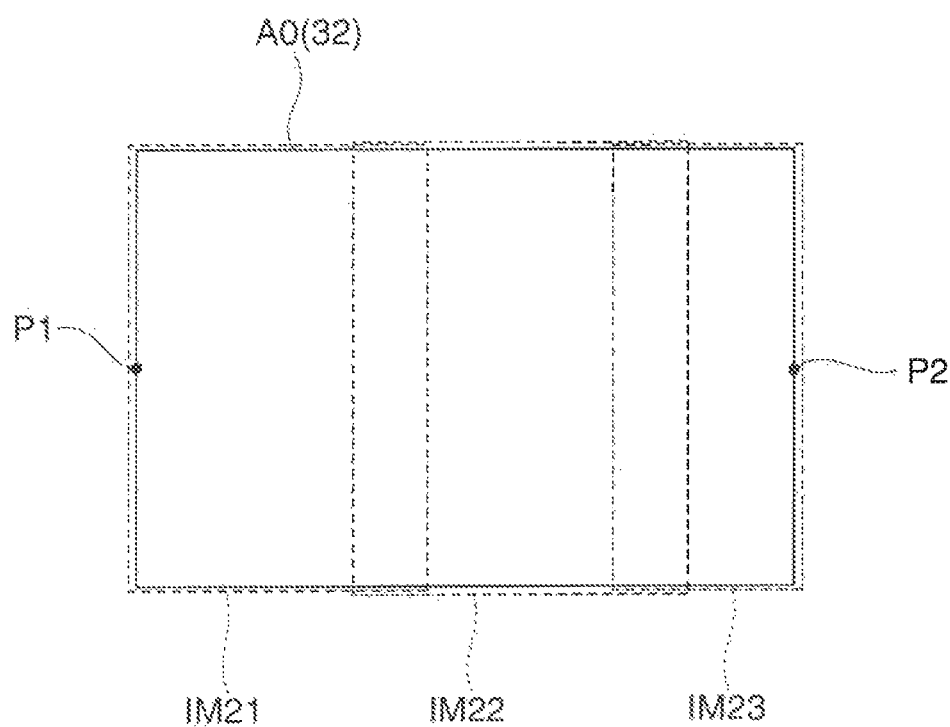

FIG. 9A is a diagram for explaining a light guide member 621 obtained by modifying the light guide member 21 shown in FIG. 2A. Although in the explanation described hereinabove it is assumed that the image light propagating in the light guide member 21 is totally reflected by the first and second reflecting surfaces 21a, 21b at two reflection angles, and propagate in two modes, it is also possible to allow three components of the image light GL31, GL32, and GL33 to be totally reflected at respective reflection angles γ1, γ2, and γ3 (γ1>γ2>γ3) as in a modified example of the light guide member 621 shown in FIG. 9A. In this case, the image light GL emitted from the liquid crystal display device 32 propagates in three modes, and is combined at the position of the eye EY of the observer and is recognized as a virtual image. In this case, as shown in FIG. 9B, a projection image IM21 totally reflected three times in total is formed in the left part of the effective display area A0, a projection image IM22 totally reflected five times in total is formed in the central part of the effective display area A0, and a projection image IM23 totally reflected seven times in total is formed in the right part of the effective display area A0.

Further, it is also possible to dispose an optical element such as a lens so as to face the light exit surface OS of the light guide member 21 shown in FIG. 2B. Alternatively, the half mirror layer 28 can be replaced with a hologram sheet coated with a protective layer. In this case, a device having a high coherent property is used as the illumination device 31, and a diffractive sheet of a laminate type for individually processing a three-color image, for example, formed by the liquid crystal display device 32 is used as the hologram sheet.

Second Embodiment

Hereinafter, a virtual image display device according to a second embodiment will be explained. It should be noted that the virtual image display device according to the present embodiment is a modified example of the virtual image display device 100 according to the first embodiment, and is assumed to be the same as the virtual image display device 100 according to the first embodiment unless particularly explained.

Figure 10:
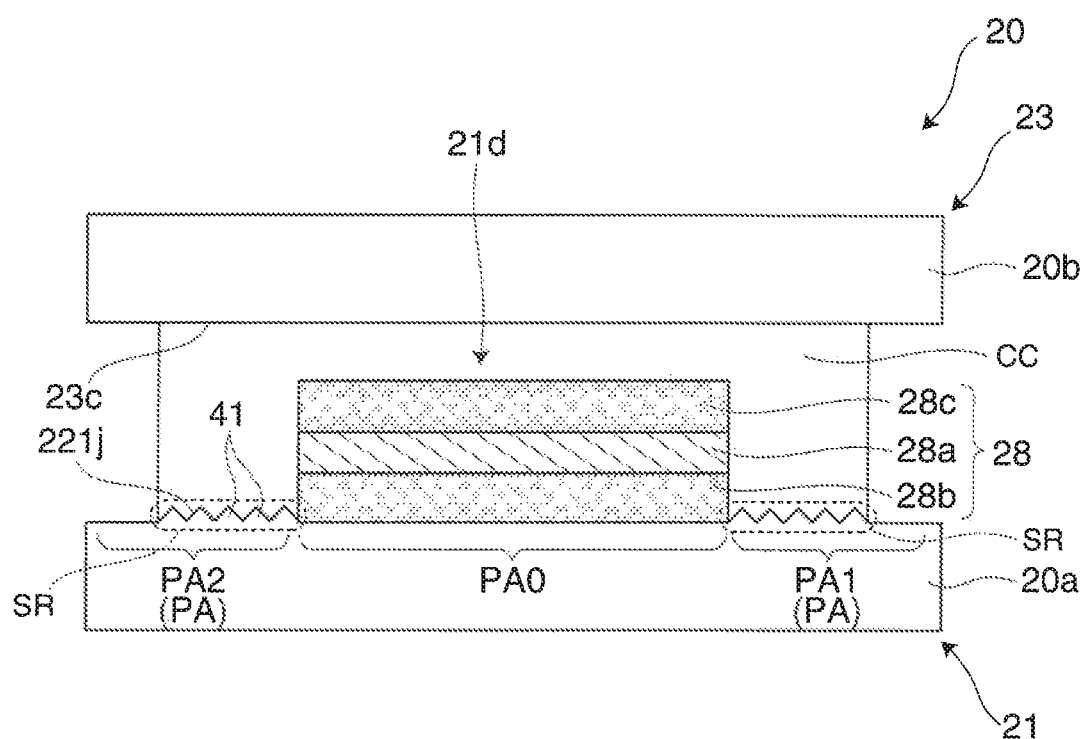
FIG. 10 is an enlarged cross-sectional view for conceptually explaining a junction section in a second embodiment of the invention.

As shown in FIG. 10, in the case of the second embodiment, in the exceptional area PA in the first junction surface 221j of the light guide member 21, there are formed rough surfaces SR each having fine undulations 41 as nonsmooth surfaces. The rough surfaces (the nonsmooth surfaces) SR are formed by, for example, performing a roughening process in advance on a transcription surface of the molding die of the body portion 20a. Further, the rough surfaces SR can also be formed by performing a roughening process or a surface modification process such as sandblast or etching by a chemical or the like after, for example, molding of the body portion 20a.

The depth of the fine undulations 41 constituting each of the rough surfaces SR is set to, for example, about several μm through several tens μm. It should be noted that although exaggerated in the drawing, the thickness of the half mirror layer (the semi-transmissive reflecting film) 28 is about, for example, several μm, and the thickness of the bonding layer CC is about, for example, 50 μm. In a specific example, the difference in refractive index between the body portion 20a of the light guide member 21 and the bonding layer CC is set to be equal to or smaller than, for example, 0.02. Thus, it is possible to prevent the external light GL' from being disturbed by the existence of the rough surfaces SR.

Figure 11:
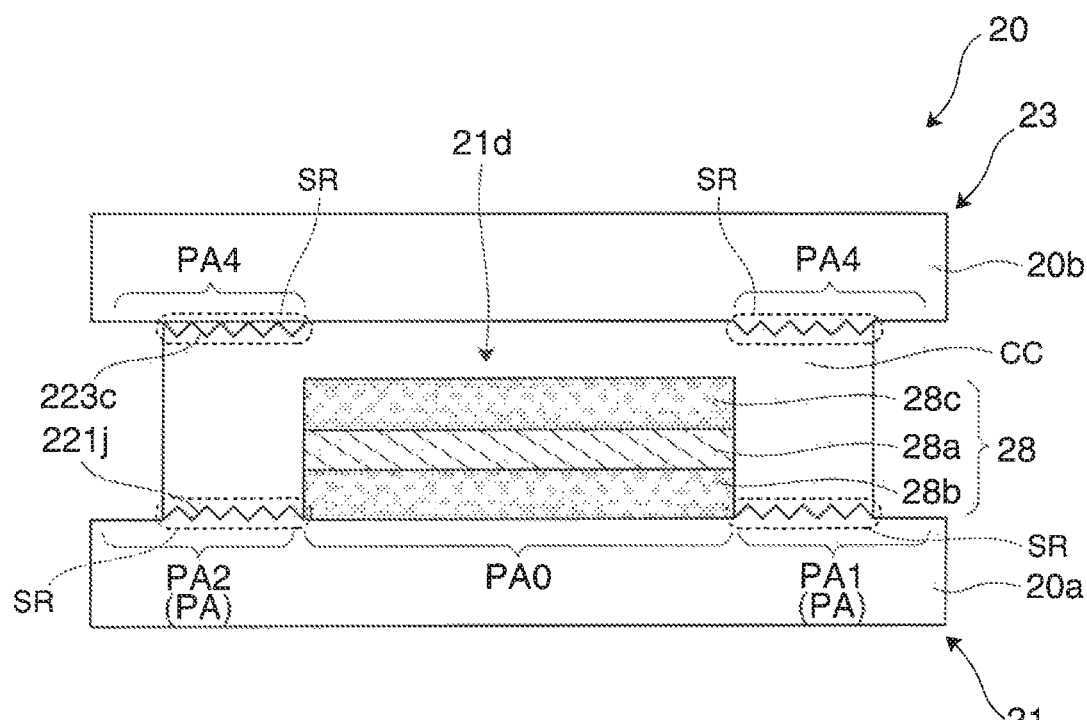
FIG. 11 is an enlarged cross-sectional view for conceptually explaining a junction section in a modified example.

FIG. 11 is a cross-sectional view for explaining a modified example of the light guide member 21 shown in FIG. 10. In the case shown in the drawing, in the opposed areas PA4 corresponding to the exceptional area PA of the first junction surface 221j out of the second junction surface 223c of the light transmitting member 23, there are formed rough surfaces SR each having fine undulations as nonsmooth surfaces. Also in this case, if the difference in refractive index between the body portion 20b of the light transmitting member 23 and the bonding layer CC is small, it is possible to prevent the external light GL' from being disturbed by the existence of the rough surfaces (the nonsmooth surfaces) SR.

It should be noted that although not shown in the drawings, it is also possible to form the entire second junction surface 223c to be the rough surface SR. Further, it is also possible to form only the second junction surface 223c to be the rough surface SR, and to form the first junction surface 221j of the light guide member 21 to be the first junction surface 21j as the smooth surface shown in FIG. 8.

According to the virtual image display device 100 according to the second embodiment, since at least one of the first junction surface 221j and the exceptional area PA of the second junction surface 223c includes the rough surface SR as the nonsmooth surface having the undulations in the light guide device 20, it is possible to increase the area of bonding or junction due to the rough surface (the nonsmooth surface) SR to thereby easily and surly increase the bonding strength between the first junction surface 221j and the second junction surface 223c.

Third Embodiment

Hereinafter, a virtual image display device according to a third embodiment will be explained. It should be noted that the virtual image display device according to the present embodiment is a modified example of the virtual image display device 100 according to the first embodiment, and is assumed to be the same as the virtual image display device 100 according to the first embodiment unless particularly explained.

Figure 12:
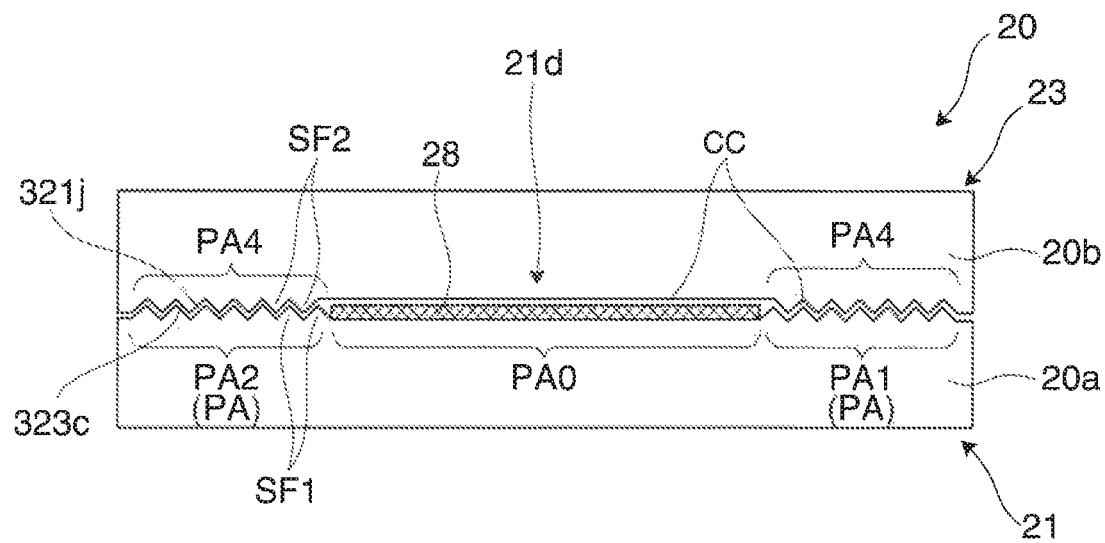
FIG. 12 is an enlarged cross-sectional view for conceptually explaining a junction section in a third embodiment of the invention.

As shown in FIG. 12, in the case of the third embodiment, in the exceptional area PA in the first junction surface 321j of the light guide member 21, there are formed first fitting shapes SF1, each of which is a relatively coarse undulation shape, as the nonsmooth surfaces having undulations. Each of the first fitting shapes (the nonsmooth surfaces) SF1 can be formed by arranging, for example, a number of V-grooves, which are linearly extending undulations, in a direction along the shorter dimension of the groove. On the other hand, in the opposed areas PA4 corresponding to the exceptional area PA of the first junction surface 321j out of the second junction surface 323c of the light transmitting member 23, there are formed second fitting shapes SF2, which are relatively coarse undulation shapes, as the nonsmooth surfaces. These second fitting shapes SF2 are each formed to have a shape obtained by reversing the undulation shape of the corresponding one of the first fitting shapes SF1. In other words, each of the first fitting shapes SF1 and the corresponding one of the second fitting shapes SF2 have the respective shapes reversed from each other having the reversed undulation patterns. Specifically, each of the second fitting shapes SF2 can be formed by arranging, for example, a number of ridge-like sections, each of which has a triangular cross-sectional shape and extends linearly, in a direction along the shorter dimension of the ridge-like section.

It should be noted that the first fitting shapes SF1 each can be formed to have convex sections and concave sections each having a pyramid shape and arranged two-dimensionally, and the second fitting shapes SF2 each can also be formed to have convex sections and concave sections each having a pyramid shape and arranged two-dimensionally as the reversed shape of the corresponding one of the first fitting shapes SF1.

According to the virtual image display device 100 of the third embodiment, a precise alignment between the light guide member 21 and the light transmitting member 23 becomes possible by fitting the first fitting shapes (the nonsmooth surfaces) SF1 of the first junction surface 321j and the second fitting shapes (the nonsmooth surfaces) SF2 of the second junction surface 323c.

Fourth Embodiment

Hereinafter, a virtual image display device according to a fourth embodiment will be explained. It should be noted that the virtual image display device according to the present embodiment is a modified example of the virtual image display device 100 according to the first embodiment, and is assumed to be the same as the virtual image display device 100 according to the first embodiment unless particularly explained.

Figure 13A:
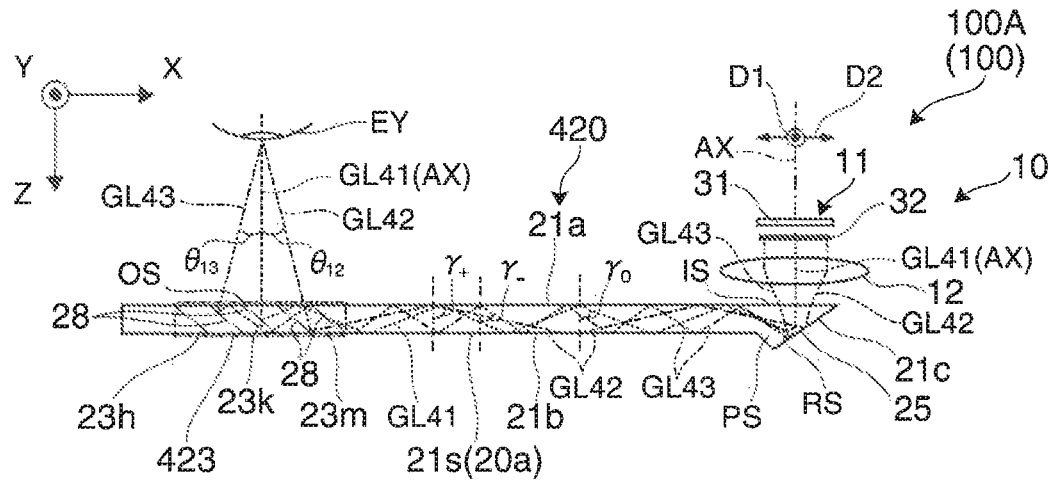
FIG. 13A is a cross-sectional view showing a virtual image display device according to a fourth embodiment of the invention.
Figure 13B:
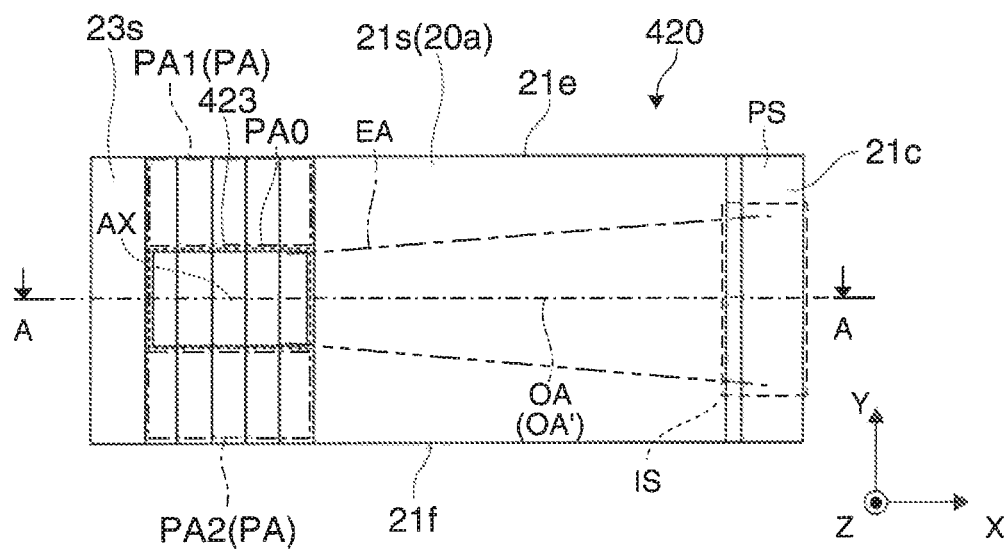
FIGS. 13B and 13C are a front view and a plan view, respectively, of a light guide device.
Figure 13C:
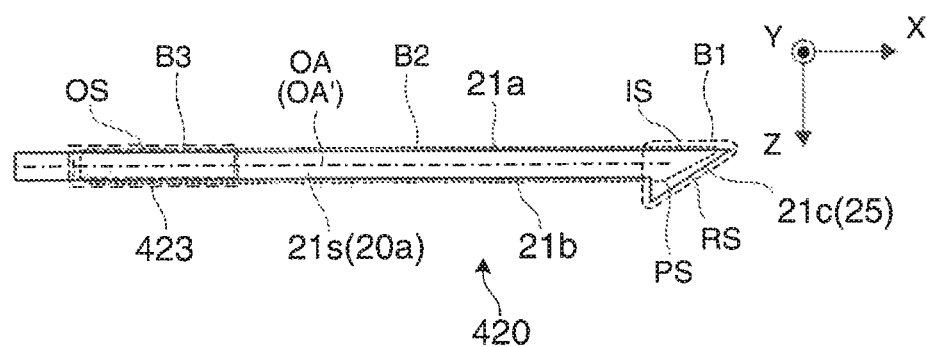

The virtual image display device 100 shown in FIGS. 13A through 13C is provided with the image forming device 10 and a light guide device 420 as a set. The light guide device 420 is provided with a light guide body member 21a, an angle conversion section 423, and a light transmitting body member 23s. It should be noted that FIG. 13A corresponds to the A-A cross-section of the light guide device 420 shown in FIG. 13B.

Figure 14:
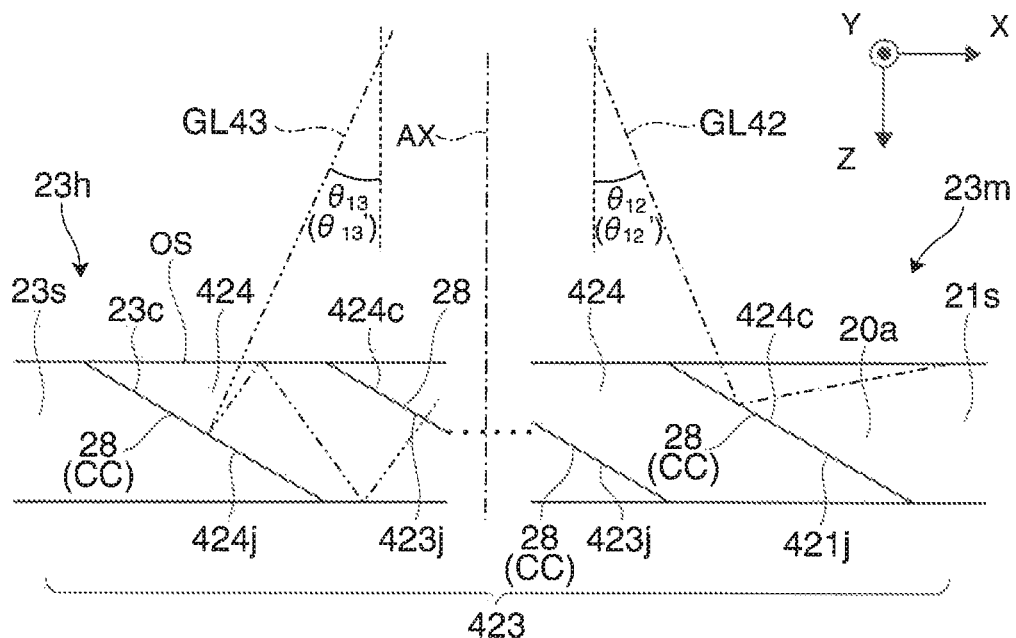
FIG. 14 is a schematic diagram for explaining a light path of image light.

An overall appearance of the light guide body member 21s is a flat plate extending in parallel to the X-Y plane in the drawing. Further, the light guide body member 21s has the first reflecting surface 21a, the second reflecting surface 21b, and the third reflecting surface 21c as the side surfaces, and further has the first junction surface 21j described later (see FIG. 14). Further, the light guide body member 21s also has a first side surface 21e and a second side surface 21f opposed to each other and contiguous to the first, second, and third reflecting surfaces 21a, 21b, and 21c. Further, the light guide body member 21s has a structure in which a prism section PS is disposed at one end thereof in the longitudinal direction, and the angle conversion section 423 composed of a number of mirrors is connected thereto at the other end thereof in the longitudinal direction.

The body portion 20a, which is a base or a substrate of the light guide body member 21s, is formed of a light transmissive resin material or the like, and has the light entrance surface IS, which takes in the image light from the image forming device 10, disposed on the flat surface on the reverse side parallel to the X-Y plane and opposed to the image forming device 10. The body portion 20a has a rectangular tilted surface RS as a side surface of the prism section PS besides the light entrance surface IS, and on the tilted surface RS, there is formed a mirror layer 25 so as to cover the tilted surface RS. Here, the mirror layer 25 cooperates with the tilted surface RS to thereby function as the third reflecting surface 21c disposed in the tilted state with respect to the light entrance surface IS. The third reflecting surface 21c bends the image light, which enters the light entrance surface IS and proceeds in the +Z direction as a whole, so as to proceed in the −X direction deflected to the −Z direction as a whole to thereby surely combine the image light within the body portion 20a.

The first and second reflecting surfaces 21a, 21b of the light guide body member 21s each totally reflect the image light bent by the prism section PS as a pair of planes, which are the principal surfaces of the body portion 20a shaped like a flat plate, opposed to each other, and extend in parallel to the X-Y plane. The image light having been reflected by the third reflecting surface 21c firstly enters the first reflecting surface 21a, and is then totally reflected. Subsequently, the image light enters the second reflecting surface 21b, and is then totally reflected. By subsequently repeating the actions described above, the image light is guided to the back side of the light guide body member 21s, namely the −X side where the angle conversion section 423 is disposed.

As shown in FIG. 13C, in the light guide body member 21s, the third reflecting surface 21c and the light entrance surface IS described later function as the light entrance section B1. Further, the body portion 20a sandwiched between the first and second reflecting surfaces 21a, 21b of the light guide body member 21s and the angle conversion section 423 described later function as the light guide section B2. It should be noted that the angle conversion section 423 functions as the light exit section B3.

The angle conversion section 423 is formed on the back side (−X side) of the light guide body member 21s along extended planes of the first and second reflecting surfaces 21a, 21b. Here, the back side end portion of the body portion 20a forms a part of the angle conversion section 423. The angle conversion section 423 has a number of half mirror layers 28 tilted with respect to the first and second reflecting surfaces 21a, 21b, and arranged in parallel to each other at regular intervals. The angle conversion section 423 reflects the image light, which has been input thereto via the first and second reflecting surfaces 21a, 21b of the light guide member 421, at a predetermined angle to thereby bend it toward the eye EY of the observer via the light exit surface OS. In other words, the angle conversion section 423 converts the angle of the image light.

The light transmitting body member 23s is a part formed by extending the angle conversion section 423 toward the back side (−X side), and is a plate-like member similarly to the light guide body member 21s of the light guide member 421.

In the above configuration, the whole or an entrance side part of the angle conversion section 423 functions as the light guide member when combined with the light guide body member 21s. Further, the whole or a back side part of the angle conversion section 423 functions as the light transmitting member when combined with the light transmitting body member 23s.

The image light emitted from the image forming device 10 and then entering the light guide body member 21s from the light entrance surface IS is evenly reflected and bent by the third reflecting surface 21c, then proceeds substantially along the optical axis AX in a condition of having certain spread while being totally reflected in the first and second reflecting surfaces 21a, 21b of the light guide body member 21s in a repeated manner, and is then further bent in the angle conversion section 423 at an appropriate angle to thereby be in the state ready to be taken out, and is then finally emitted to the outside from the light exit surface OS attached to the angle conversion section 423. The image light emitted to the outside from the light exit surface OS enters the eye EY of the observer as the virtual image light.

The light path of the image light in the light guide device 420 will hereinafter be explained. It should be noted that the light guide device 420 in the fourth embodiment functions similarly to the light guide device 20 shown in FIG. 1A with respect to the vertical first direction D1 (the Y direction). In contrast, the light guide device 420 is arranged to guide the image light with a number of propagation modes with respect to the horizontal second direction D2 (the X direction), and is different from the light guide device 20 shown in FIG. 2A for guiding the image light with the two propagation modes.

As shown in FIG. 13A, it is assumed that, out of the image light output from the liquid crystal display device (the image light forming section) 32 of the image display device 11, the component emitted from the central portion of the emission surface 32a indicated by the dotted line is image light GL41, the component emitted from the right side (+X side) of the sheet of the emission surface 32a indicated by the dashed-dotted line is image light GL42, and the component emitted from the left side (−X side) of the sheet of the emission surface 32a indicated by the dashed-two dotted line is image light GL43.

The principal components of the respective image lights GL41, GL42, and GL43 having passed through the projection optical system 12 enter from the light entrance surface IS of the light guide body member 21s, and then repeat the total reflection on the first and second reflecting surfaces 21a, 21b at respective angles different from each other. Specifically, among the image lights GL41, GL42, and GL43, the image light GL41 emitted from the central portion of the emission surface 32a of the liquid crystal display device (the image light forming section) 32 enters the light entrance surface IS as a parallel light beam after passing through the projection optical system 12, and is then reflected by the third reflecting surface 21c, and then enters the first reflecting surface 21a of the light guide body member 21s at a standard reflection angle $\gamma_0$, and is then totally reflected.

Subsequently, the image light GL41 repeats the total reflection on the first and second reflecting surfaces 21a, 21b in a condition of keeping the standard reflection angle $\gamma_0$. The image light GL41 is totally reflected by the first and second reflecting surfaces 21a, 21b N times (N denotes a natural number), and then reaches the central portion 23k of the angle conversion section 423. The image light GL41 reflected by the central portion 23k is emitted from the light exit surface OS in the direction of the optical axis AX perpendicular to the light exit surface OS or the X-Y plane as a parallel light beam.

The image light GL42 emitted from one end side (+X side) of the emission surface 32a of the liquid crystal display device 32 enters the light entrance surface IS as a parallel light beam after passing through the projection optical system 12, and is then reflected by the third reflecting surface 21c, and then enters the first reflecting surface 21a of the light guide body member 21s at the maximum reflection angle $\gamma_+$, and is then totally reflected. The image light GL42 is totally reflected by the first and second reflecting surfaces 21a, 21b N−M times (M denotes a natural number), for example, and then reaches the peripheral portion 23m the nearest to the entrance (+X side) in the angle conversion section 423. The image light GL42 reflected by the peripheral portion 23m is emitted in the direction forming an obtuse angle with respect to the +X axis so as to get away from the third reflecting surface 21c at the entrance, and tilted by an angle $\theta_{12}$ ($\theta_{12}'$ in the light guide device 420) with respect to the optical axis AX (see FIG. 14).

The image light GL43 emitted from the other end side (−X side) of the emission surface 32a of the liquid crystal display device 32 enters the light entrance surface IS as a parallel light beam after passing through the projection optical system 12, and is then reflected by the third reflecting surface 21c, and then enters the first reflecting surface 21a of the light guide body member 21s at the minimum reflection angle $\gamma_-$, and is then totally reflected. The image light GL43 is totally reflected by the first and second reflecting surfaces 21a, 21b N+M times, for example, and then enters the peripheral portion 23h the furthest from the entrance (−X side) in the angle conversion section 423. The image light GL43 reflected by the peripheral portion 23h is emitted in the direction forming an acute angle with respect to the +X axis so as to be set back toward the third reflecting surface 21c, and tilted by an angle $\theta_{13}$ ($\theta_{13}'$ in the light guide device 420) with respect to the optical axis AX (see FIG. 14).

Figure 15:
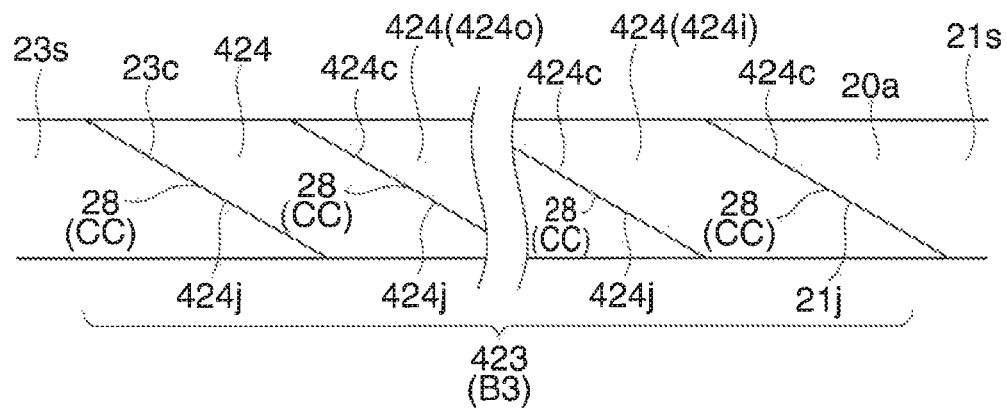
FIG. 15 is a cross-sectional view for explaining a junction section including a half mirror layer.

As shown in FIG. 15, the angle conversion section 423 has a structure having a number of prisms 424 arranged in the X direction at a predetermined pitch. Each of the prisms 424 has a first junction surface 424j on the light exit side, and has a second junction surface 424c on the light entrance side. On the first junction surface 21j of the light guide body member 21s or the body portion 20a, and the first junction surface 424j of each of the prisms 424, there is formed the half mirror layer 28 as a semi-transmissive reflecting film in a localized partial area. The area where the half mirror layer 28 is formed is arranged to correspond to the partial area PA0 shown in FIG. 13B. In other words, the half mirror layer 28 is not formed in the exceptional area PA composed of the peripheral areas PA1, PA2. Similarly to the case shown in FIG. 8, the body portion 20a, each of the prisms 424, and the light transmitting body member 23s are bonded to each other with the bonding layer CC in the partial area PA0 and the exceptional area PA. Specifically, the first junction surface 21j, 424j of the light guide body member 21s or the angle conversion section 423 and the second junction surface 424c, 23c of the angle conversion section 423 or the light transmitting body member 23s are bonded to each other via the bonding layer CC. It should be noted here that it is assumed that regarding the junction having the half mirror layer 28 intervening therein, the inner prism 424i nearer to the light source out of the pair of prisms 424 adjacent to each other is regarded as a light guide member, and the outer prism 424o further from the light source is regarded as a light transmitting member.

According to the virtual image display device 100 of the fourth embodiment, since the half mirror layer (the semi-transmissive reflecting film) 28 provided to the light guide body member 21s or the angle conversion section 423 is formed on the partial area PA0 of the first junction surface 21j, 424j, and the second junction surface 424c, 23c of the angle conversion section 423 or the light transmitting body member 23s is bonded to the first junction surface 21j, 424j in at least the exceptional area PA in the light guide device 420, it is possible to increase the bonding strength of the first junction surface 21j, 424j and the second junction surface 424c, 23c, namely the strength of the light guide device 420 composed of the light guide body member 21s, the angle conversion section 423, and the light transmitting body member 23s combined with each other even in the case in which the attachment force of the half mirror layer (the semi-transmissive reflecting film) 28 with respect to the first junction surface 21j, 424j is not sufficiently strong.

The first junction surfaces 21j, 424j and the second junction surfaces 424c, 23c are not limited to a smooth surface, but can be formed to be the rough surface SR shown in FIG. 10, which can increase the bonding strength by the bonding layer CC. Further, the first junction surfaces 21j, 424j and the second junction surfaces 424c, 23c can also be arranged to be provided with the fitting shapes SF1, SF2 as the relatively coarse undulation shapes shown in FIG. 12, and it is possible to align the light guide body member 21s, the angle conversion section 423, and the light transmitting body member 23s with ease and relative precision before bonding.

It should be noted that the light guide body member 21s, the angle conversion section 423, the light transmitting body member 23s, and so on can be arranged to be covered by a hard coat layer. In other words, it is also possible to form the first and second reflecting surfaces 21a, 21b, and so on by covering, for example, the surface of the body portion 20a with the hard coat layer.

Fifth Embodiment

Hereinafter, a virtual image display device according to a fifth embodiment will be explained. It should be noted that the virtual image display device according to the present embodiment is a modified example of the virtual image display device 100 according to the first embodiment, and is assumed to be the same as the virtual image display device 100 according to the first embodiment unless particularly explained.

Figure 16A:
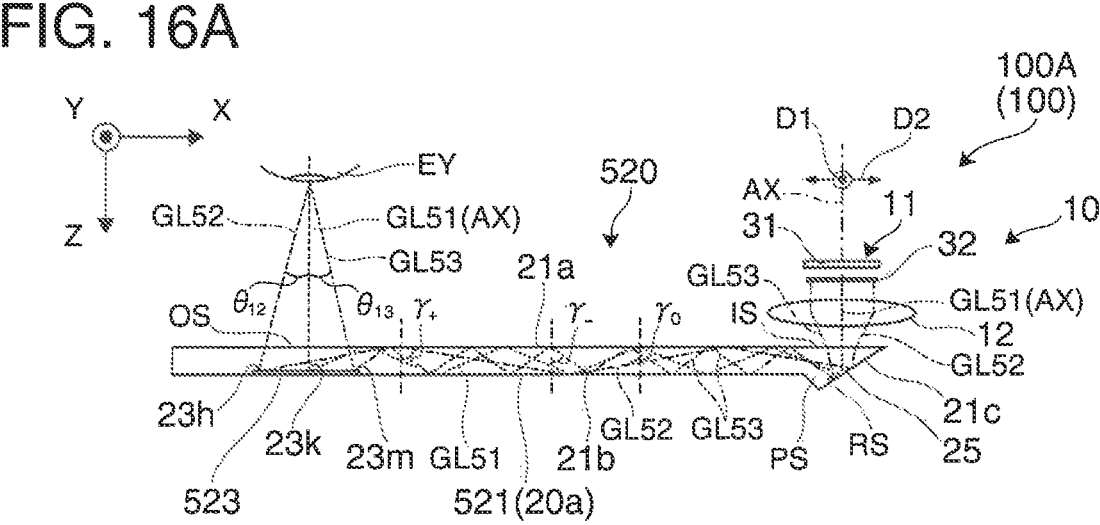
FIG. 16A is a cross-sectional view showing a virtual image display device according to a fifth embodiment of the invention.
Figure 16B:
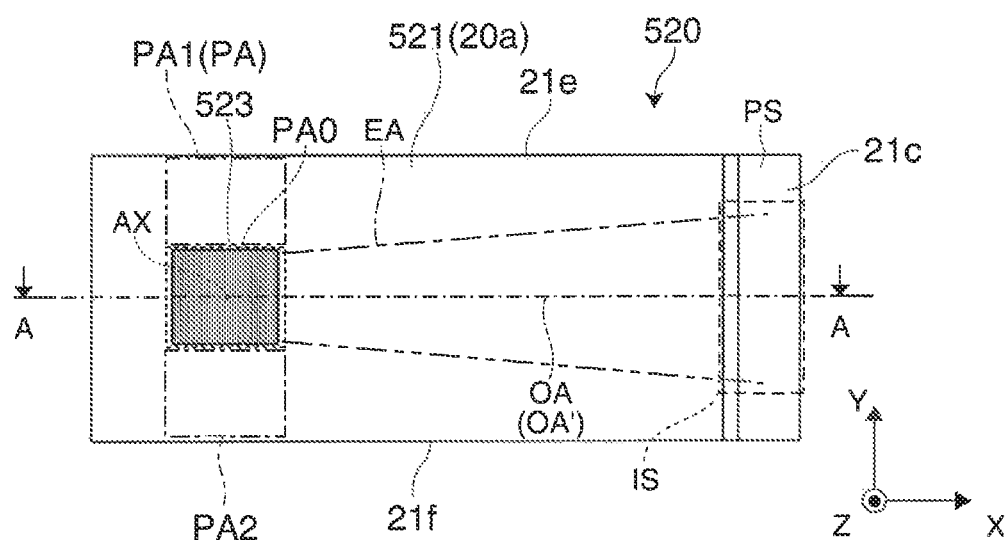
FIGS. 16B and 16C are a front view and a plan view, respectively, of a light guide device.
Figure 16C:
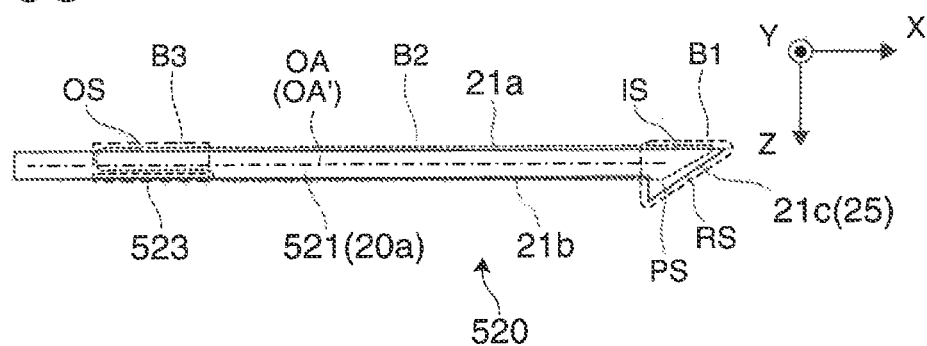

The virtual image display device 100 shown in FIGS. 16A through 16C is provided with the image forming device 10 and a light guide device 520 as a set. The light guide device 520 has a light guide member 521 as a part thereof. The light guide member 521 is provided with a body portion 20a and an angle conversion section 523 as an image take-out section. It should be noted that FIG. 16A corresponds to the A-A cross-section of the light guide member 521 shown in FIG. 16B.

The overall appearance of the light guide member 521 is formed by the body portion 20a, which is a flat plate extending in parallel to the X-Y plane in the drawings. Further, the light guide member 521 has the first reflecting surface 21a, the second reflecting surface 21b, and the third reflecting surface 21c as the side surfaces. Further, the light guide member 521 also has the first side surface 21e and the second side surface 21f opposed to each other and contiguous to the first, second, and third reflecting surfaces 21a, 21b, and 21c. Further, the light guide member 521 has a structure in which the prism section PS is disposed as a part of the body portion 20a at one end thereof in the longitudinal direction, and the angle conversion section 523 composed of a number of micro mirrors embedded in the body portion 20a is disposed at the other end thereof in the longitudinal direction. Although the light guide member 521 is an integrated component, it is possible to consider the light guide member 521 divided into the light entrance section B1, the light guide section B2, and the light exit section B3 (see FIG. 16C) similarly to the case of the first embodiment, and among these sections, the light entrance section B1 is a part having the third reflecting surface 21c and the light entrance surface IS described later, the light guide section B2 is a part having the first and second reflecting surfaces 21a, 21b, and the light exit section B3 is a part having the angle conversion section 523 and the light exit surface OS described later.

The body portion 20a is formed of a light transmissive resin material or the like, and has the light entrance surface IS for taking in the image light from the image forming device 10 and a light exit surface OS for emitting the image light toward the eye EY of the observer on the plane on the reverse side opposed to the image forming device 10 or on the observer side, the plane being parallel to the X-Y plane. The body portion 20a has a rectangular tilted surface RS as a side surface of the prism section PS besides the light entrance surface IS, and on the tilted surface RS, there is formed a mirror layer 25 so as to cover the tilted surface RS. Here, the mirror layer 25 cooperates with the tilted surface RS to thereby function as the third reflecting surface 21c, which is an incident light bending section, and disposed in the tilted state with respect to the light entrance surface IS. The third reflecting surface 21c bends the image light, which enters from the light entrance surface IS and proceeds in the +Z direction as a whole, so as to proceed in the −X direction deflected to the −Z direction as a whole to thereby surely combine the image light within the body portion 20a. Further, in the body portion 20a, there is formed the angle conversion section 523 as a microstructure along the plane on the reverse side of the light exit surface OS. The body portion 20a extends from the third reflecting surface 21c on the entrance side to the angle conversion section 523 on the back side, and guides the image light, which is input inside via the prism section PS, to the angle conversion section 523.

The first and second reflecting surfaces 21a, 21b of the light guide member 521 each totally reflect the image light bent by the prism section PS or the light entrance section B1 as a pair of planes, which are the principal surfaces of the body portion 20a shaped like a flat plate, opposed to each other, and extend in parallel to the X-Y plane. The image light having been reflected by the third reflecting surface 21c firstly enters the first reflecting surface 21a, and is then totally reflected. Subsequently, the image light enters the second reflecting surface 21b, and is then totally reflected. By subsequently repeating the actions described above, the image light is guided to the back side of the light guide device 520, namely the −X side where the angle conversion section 523 is disposed.

The angle conversion section 523 disposed so as to face the light exit surface OS of the body portion 20a is formed along an extended plane of the second reflecting surface 21b and close to the extended plane in the back side (−X side) of the light guide member 521. The angle conversion section 523 reflects the image light, which has been input thereto via the first and second reflecting surfaces 21a, 21b of the light guide member 521, at a predetermined angle to thereby bend it toward the light exit surface OS. In other words, the angle conversion section 523 converts the angle of the image light.

The image light emitted from the image forming device 10 and then entering the light guide member 521 from the light entrance surface IS is evenly reflected and bent by the third reflecting surface 21c, then proceeds substantially along the optical axis AX in a condition of having certain spread while being totally reflected by the first and second reflecting surfaces 21a, 21b of the light guide member 521 in a repeated manner, and is then further bent in the angle conversion section 523 at an appropriate angle to thereby be in the state ready to be taken out, and is then finally emitted to the outside from the light exit surface OS. The image light emitted to the outside from the light exit surface OS enters the eye EY of the observer as the virtual image light. By the virtual image light forming an image on the retina of the observer, the observer can recognize the image light such as the picture light due to the virtual image.

The light path of the image light in the light guide device 520 will hereinafter be explained. It should be noted that the light guide device 520 in the fifth embodiment functions similarly to the light guide device 20 shown in FIG. 1A with respect to the vertical first direction D1 (the Y direction). In contrast, the light guide device 520 is arranged to guide the image light with a number of propagation modes with respect to the horizontal second direction D2 (the X direction), and is different from the light guide device 20 shown in FIG. 2A for guiding the image light with the two propagation modes.

As shown in FIG. 16A, it is assumed that, out of the image light output from the liquid crystal display device (the image light forming section) 32 of the image display device 11, the component emitted from the center portion of the emission surface 32a indicated by the dotted line is image light GL51, the component emitted from the right side (+X side) of the sheet of the emission surface 32a indicated by the dashed-dotted line is image light GL52, and the component emitted from the left side (−X side) of the sheet of the emission surface 32a indicated by the dashed-two dotted line is image light GL53.

The principal components of the respective image lights GL51, GL52, and GL53 having passed through the projection optical system 12 enter from the light entrance surface IS of the light guide member 521, and then repeat the total reflection on the first and second reflecting surfaces 21a, 21b at respective angles different from each other. Specifically, among the image lights GL51, GL52, and GL53, the image light GL51 emitted from the central portion of the emission surface 32a of the liquid crystal display device (the image light forming section) 32 enters the light entrance surface IS as a parallel light beam after passing through the projection optical system 12, and is then reflected by the third reflecting surface 21c, and then enters the first reflecting surface 21a of the light guide member 521 at a standard reflection angle $\gamma_0$, and is then totally reflected. Subsequently, the image light GL51 repeats the total reflection on the first and second reflecting surfaces 21a, 21b in a condition of keeping the standard reflection angle $\gamma_0$. The image light GL51 is totally reflected by the first and second reflecting surfaces 21a, 21b N times (N denotes a natural number), and then reaches the center portion 23k of the angle conversion section 523. The image light GL51 reflected by the central portion 23k is emitted from the light exit surface OS in the direction of the optical axis AX perpendicular to the light exit surface OS or the X-Y plane as a parallel light beam.

The image light GL52 emitted from one end side (+X side) of the emission surface 32a of the liquid crystal display device 32 enters the light entrance surface IS as a parallel light beam after passing through the projection optical system 12, and is then reflected by the third reflecting surface 21c, and then enters the first reflecting surface 21a of the light guide member 521 at the maximum reflection angle $\gamma_+$, and is then totally reflected. The image light GL52 is totally reflected by the first and second reflecting surfaces 21a, 21b N−M times (M denotes a natural number), for example, and then reaches the peripheral portion 23h the furthest from the entrance (−X side) in the angle conversion section 523. The image light GL52 reflected by the peripheral portion 23h is emitted in the direction forming an acute angle with respect to the +X axis so as to be set back toward the third reflecting surface 21c at the entrance, and tilted by an angle $\theta_{12}$ ($\theta_{12}'$ in the light guide device 520) with respect to the optical axis AX (see FIG. 17).

The image light GL53 emitted from the other end side (−X side) of the emission surface 32a of the liquid crystal display device 32 enters the light entrance surface IS as a parallel light beam after passing through the projection optical system 12, and is then reflected by the third reflecting surface 21c, and then enters the first reflecting surface 21a of the light guide member 521 at the minimum reflection angle $\gamma_-$, and is then totally reflected. The image light GL53 is totally reflected by the first and second reflecting surfaces 21a, 21b N+M times, for example, and then enters the peripheral portion 23m the nearest to the entrance (+X side) in the angle conversion section 523. The image light GL53 reflected by the peripheral portion 23m is emitted in the direction forming an obtuse angle with respect to the +X axis so as to get away from the third reflecting surface 21c, and tilted by an angle $\theta_{13}$ ($\theta_{13}'$ in the light guide device 520) with respect to the optical axis AX (see FIG. 17).

Figure 17:
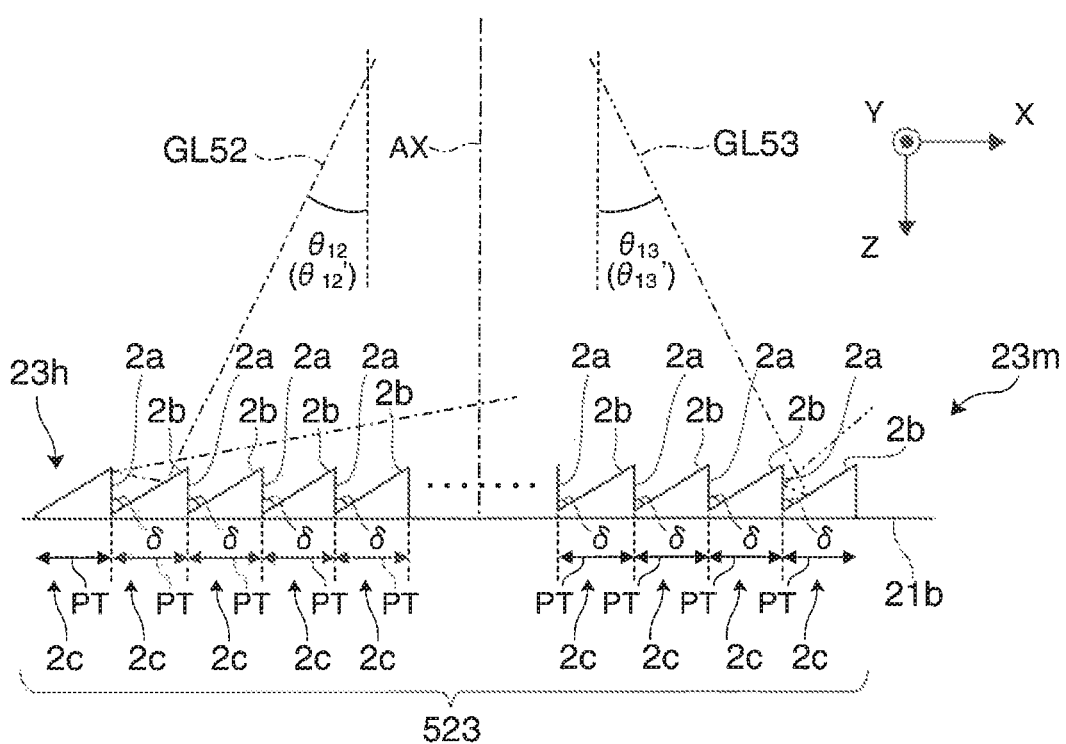
FIG. 17 is a schematic diagram for explaining a light path of image light.

It should be noted that as shown in FIG. 17, the angle conversion section 523 is composed of a number of linear reflecting units 2c arranged in a stripe manner. In other words, the angle conversion section 523 is configured by arranging a number of elongated reflecting units 2c, which extend in the Y direction, along a main light guide direction along which the angle conversion section 523 extends, namely the −X direction at a predetermined pitch PT. Each of the reflecting units 2c has a first reflecting surface 2a and a second reflecting surface 2b as a set of reflecting surfaces, wherein the first reflecting surface 2a is one reflecting surface component disposed on the back side, namely the downstream side of the light path, and the second reflecting surface 2b is another reflecting surface component disposed on the entrance side, namely the upstream side of the light path, and the both reflecting surfaces 2a, 2b form a constant wedge angle δ. Among these reflecting surfaces, at least the second reflecting surface 2b is a partial reflecting surface capable of transmitting some of the light, and enables the observer to observe the external image in a see-through manner. In the reflecting unit 2c, the image lights GL52, GL53 are firstly reflected by the first reflecting surface 2a on the back side, namely the −X side, and are then reflected by the second reflecting surface 2b on the entrance side, namely the +X side. The image lights GL52, GL53 having passed through the reflecting unit 2c are bent to have desired angles with only a single passage in the angle conversion section 523, and are then taken out to the observer side without passing through any other reflecting units 2c.

Figure 18:
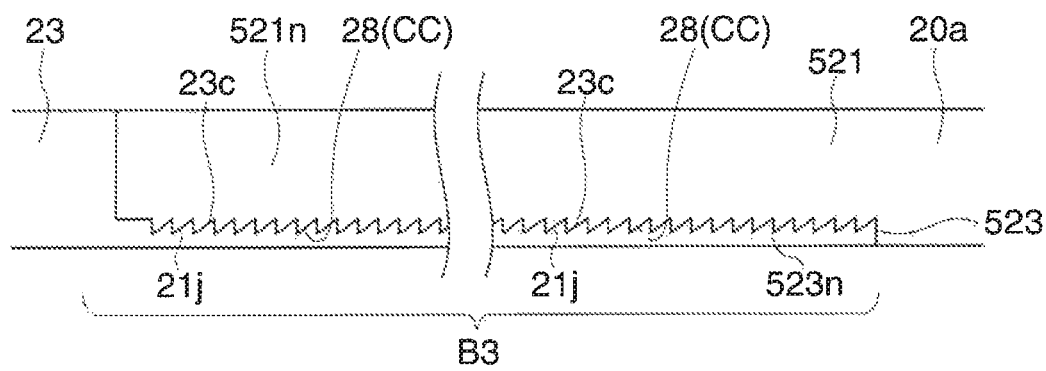
FIG. 18 is a cross-sectional view for explaining a junction section including a half mirror layer.

As shown in FIG. 18, the angle conversion section 523 has a structure having a bonding member 521n extending from the light guide member 521 and having a relatively thick plate-like shape, and a bonding member 523n extending from the light transmitting member 23 and having a relatively thin plate-like shape bonded to each other. The bonding member 521n has the first junction surface 21j on the obverse side or the external side, and the bonding member 523n has the second junction surface 23c on the reverse side or the observer side. On the first junction surface 21j of the bonding member 521n, there is formed the half mirror layer 28 as a semi-transmissive reflecting film in a localized partial area. The area where the half mirror layer 28 is formed is arranged to correspond to the partial area PA0 shown in FIG. 16B. In other words, the half mirror layer 28 is not formed in the exceptional area PA composed of the peripheral areas PA1, PA2. Similarly to the case shown in FIG. 8, the bonding member 521n of the light guide member 521 and the bonding member 523n of the light transmitting member 23 are bonded to each other with the bonding layer CC in the partial area PA0 and the exceptional area PA. In other words, the first junction surface 21j of the bonding member 521n and the second junction surface 23c of the bonding member 523n are bonded to each other via the bonding layer CC.

According to the virtual image display device 100 of the fifth embodiment, since the half mirror layer (the semi-transmissive reflecting film) 28 provided to the bonding member 521n of the light guide member 521 is formed on the partial area PA0 of the first junction surface 21j, and the second junction surface 23c of the angle conversion section 523 is bonded to the first junction surface 21j in at least the exceptional area PA in the light guide device 520, it is possible to increase the bonding strength of the first junction surface 21j and the second junction surface 23c, namely the strength of the light guide device 520 composed of the light guide member 521 and the light transmitting member 23 combined with each other even in the case in which the attachment force of the half mirror layer (the semi-transmissive reflecting film) 28 with respect to the first junction surface 21j is not sufficiently strong.

The first junction surface 21j and the second junction surface 23c are not limited to a smooth surface, but can be formed to be the rough surface SR shown in FIG. 10 and so on, which can increase the bonding strength by the bonding layer CC. Further, the first junction surface 21j and the second junction surface 23c can also be arranged to be provided with the fitting shapes SF1, SF2 as the relatively coarse undulation shapes shown in FIG. 12, and it is possible to align the light guide member 521 and the light transmitting member 23 with ease and relative precision before bonding.

Other Issues

Although the invention is hereinabove explained along the embodiments, the invention is not limited to the embodiments described above, but can be put into practice in various forms within the scope or the spirit of the invention, and the following modifications, for example, are also possible.

Although in the above explanation the first junction surface 21j and the second junction surface 23c are bonded to each other in the partial area PA0 and the exceptional area PA, it is also possible to bond the first junction surface 21j and the second junction surface 23c to each other only in the exceptional area PA. In this case, it is possible to perform bonding in the entire exceptional area PA, and it is also possible to perform bonding in a plurality of bonding areas provided to the exceptional area PA.

Although in the above explanation it is assumed that the half mirror layer (the semi-transmissive reflecting film) 28 is formed in the horizontally long rectangular area, the contour of the half mirror layer 28 can arbitrarily be changed in accordance with the specifications such as the purpose. It should be noted that it is desirable for the half mirror layer 28 to sufficiently cover the effective area EA.

Although in the above explanation the light guide member 21 and the light transmitting member 23 are coupled in series on each other, it is also possible to fix the first and second side surfaces 21e, 21f of the light guide member 21 with the frame member extending from the light transmitting member 23 in a reinforcing manner.

Although in the above explanation the transmissive liquid crystal display device 32 and so on are used as the image light forming section, the image light forming section is not limited to the transmissive liquid crystal display device, but a variety of devices can be used. For example, the configuration using the reflective liquid crystal display device is also possible, and it is also possible to use the Digital Micromirror Device™ and so on instead of the liquid crystal display device 32. Further, it is also possible to use a light emitting display device such as an organic EL device instead of the liquid crystal display device.

Although in the embodiments described above directionality is not particularly provided to the illumination light SL from the illumination device 31, it is possible to provide the directionality corresponding to the location of the liquid crystal display device 32 to the illumination light SL. Thus, it is possible to efficiently illuminate the liquid crystal display device 32, and the luminance variation due to the location of the image light GL can be reduced.

Although in the above explanation, the light entrance surface IS and the light exit surface OS are disposed on the same plane, the configuration is not limited thereto, but the configuration of disposing the light entrance surface IS on the same surface as the first reflecting surface 21a, and the light exit surface OS on the same surface as the second reflecting surface 21b, for example, can also be adopted. In this case, it results that the first reflecting surface 21a and the fourth reflecting surface 21d form an obtuse angle.

Although in the above explanation, the light guide member 21 extends in the lateral direction along which the eyes EY are arranged, it is possible to arrange that the light guide member 21 extends in a vertical direction. In this case, it results that the optical panels 110 shown in FIG. 1, namely the light guide members 21, 421, 521, are not disposed serially but disposed in parallel to each other.

Although in the above explanation, the light guide device 20, 420, 520 provided with the light entrance section B1, the light guide section B2, and the light exit section B3 is used, in the light entrance section B1 and the light exit section B3, it is not necessary to use a flat mirror or a flat half mirror as the half mirror layer 28 and so on, but it is also possible to provide a function like a lens by adopting a curved mirror having a spherical shape or a aspherical shape. Further, it is also possible to dispose a hologram element as an imaginary semi-transmissive mirror instead of the half mirror layer 28. In this case, the hologram element is also included in the semi-transmissive reflecting surface in a broad sense. It should be noted that it is also possible to add an optical function such as light collection to such a hologram element.

Figure 19:
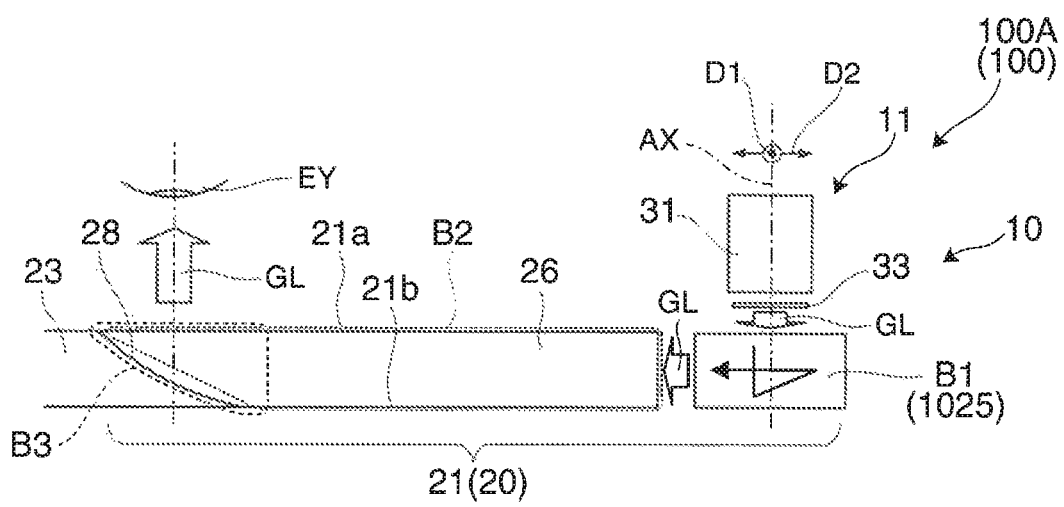
FIG. 19 is a conceptual diagram for explaining a virtual image display device according to a modified example.

Further, as shown in FIG. 19, a prism or a block-like relay member 1025 separated from the light guide section B2 can be used as the light entrance section B1, and it is also possible to provide a function like a lens to an entrance/exit surface and a reflective inner surface of the relay member 1025. It should be noted that although a light guide body 26 constituting the light guide section B2 is provided with the first and second reflecting surfaces 21a, 21b for making the image light GL propagate with reflection, these reflecting surfaces 21a, 21b are not required to be parallel to each other, but can be formed to have a curved shape. The light guide body 26 shown in FIG. 19 is bonded to the light transmitting member 23, and the junction section of the light guide body and the light transmitting member is provided with the half mirror layer 28. Also in this case, similarly to the case of the first embodiment, by bonding the light guide body 26 and the light transmitting member 23 to each other in at least the exceptional area in the periphery of the half mirror layer 28, the bonding strength between the light guide body 26 and the light transmitting member 23 can be increased, and thus the strength of the light guide device 20 can be increased.

Although in the explanation described above the specific explanation is presented assuming that the virtual image display device 100 is the head-mount display, it is also possible to modify the virtual image display device 100 into a head-up display.

Although the virtual image display device 100 according to the embodiments described above has a configuration of providing the display devices 100A, 100B (each including specifically the image forming device 10, the light guide device 20, and so on) corresponding respectively to the right eye and the left eye, it is also possible to adopt a configuration of providing the image forming device 10 and the light guide device 20 corresponding to either one of the right and left eyes to thereby view the image with a single eye.

Although in the embodiments described above, it is assumed that the first optical axis AX1 passing through the light entrance surface IS and the second optical axis AX2 passing through the light entrance surface IS are parallel to each other, it is also possible to make these optical axes AX1, AX2 non-parallel to each other.

Although in the embodiments described above the display luminance of the liquid crystal display device 32 is not particularly adjusted, it is possible to perform adjustment of the display luminance in accordance with the ranges and the overlap of the projection images IM1, IM2 shown in FIG. 6B.

Although in the embodiments described above the reflectance of the half mirror layer 28 provided to the fourth reflecting surface 21d of the light guide member 21 is set to 20% to thereby give priority to see-through image, it is also possible to set the reflectance of the half mirror layer 28 to not lower than 50% to thereby give priority to the image light. It should be noted that the half mirror layer 28 can be formed on the second junction surface 23c of the light transmitting member 23.

Although in the above explanation it is assumed that in the first and second reflecting surfaces 21a, 21b, the image light is totally reflected by the interface with air to thereby guide the image light without providing a mirror or a half mirror on the surfaces, the total reflection in the invention includes the reflection performed by the mirror coat or the half mirror film formed on the entire or a part of each of the first and second reflecting surfaces 21a, 21b. For example, there is included the case in which the mirror coat or the like is applied to the entire or a part of each of the first and second reflecting surfaces 21a, 21b with the incident angle of the image light fulfilling the total reflection condition, thereby reflecting the substantially whole image light. Further, it is also possible to coat the entire or a part of each of the first and second reflecting surfaces 21a, 21b with a mirror having some transmissive property providing the image light with sufficient brightness can be obtained.

Further, in the explanation of the fourth and fifth embodiments, the pitch PT of the arrangement of the reflecting units 2c constituting the angle conversion section 423, 523 is not limited to the case in which the pitch PT is constant throughout the first reflecting surface 2a, but includes the case in which the pitch PT has a certain variation.

Although in the above explanation the mirror layer 25 constituting the prism section PS and the tilt angle of the tilted surface RS are not particularly mentioned, the tilt angle of the mirror layer 25 and so on with respect to the optical axis AX can be set to various values in accordance with the specifications such as the purpose.

Although in the explanation of the fourth and fifth embodiments described above the V-shaped groove formed with the reflecting unit 2c is shown as if the tip thereof is in the pointed state, the shape of the V-shaped groove is not limited thereto, but can be one having the tip cut flatly or one having the tip provided with a round shape.

The entire disclosure of Japanese Patent Application No. 2011-216712, filed Sep. 30, 2011 is expressly incorporated by reference herein.

What is claimed is:
1. A virtual image display device comprising:
an image display device that emits an image light;
a light guide body member that guides the image light from the image display device along a first direction and emits the image light outside;
a prism that bonds the light guide body member along the first direction;
a light transmitting body member that bonds the prism along the first direction, wherein:
the light guide body member and the prism bond a first junction surface of the light guide body member and a first junction surface of the prism, the prism and the light transmitting body member bond a second junction surface of the prism and a first junction surface of the light transmitting body member, the first junction surface of the light guide body member includes a first semi-transmissive reflecting surface and a first peripheral area that is an adjacent area from the first semi-transmissive reflecting surface along a second direction that intersects the first direction, and the second junction surface of the prism includes a second semi-transmissive reflecting surface and a second peripheral area that is an adjacent area from the second semi-transmissive reflecting surface along the second direction.

2. The virtual image display device according to claim 1, wherein the prism includes a first prism and a second prism, and the first prism and the second prism are disposed along the first direction, the light guide body member and the first prism bond the first junction surface of the light guide body member and the first junction surface of the first prism, the first prism and the second prism bond a second junction surface of the first prism and a first junction surface of the second prism, the second prism and the light transmitting body member bond the second junction surface of the second prism and the first junction surface of the light transmitting body member, the second junction surface of the first prism includes a third semi-transmissive reflecting surface and a third peripheral area that is an adjacent area from the third semi-transmissive reflecting surface along the second direction, and the first semi-transmissive reflecting surface, the second semi-transmissive reflecting surface and the third semi-transmissive reflecting surface are disposed at even intervals.

3. The virtual image display device according to claim 1, wherein the prism includes a plurality of prisms and a plurality of semi-transmissive reflecting surfaces that are disposed inbetween intervals of the plurality of prisms at even intervals.

4. The virtual image display device according to claim 1, wherein the first peripheral area is adjacent at both ends of the first semi-transmissive reflecting surface along the second direction, and the second peripheral area is adjacent at both ends of the second semi-transmissive reflecting surface along the second direction.

5. The virtual image display device according to claim 1, wherein the light guide body member includes:
a light entrance section adapted to take in the image light from the image display device, and
a light guide section adapted to guide the image light from the light entrance section using total reflection by a first surface and a second surface opposed to each other, the first direction is a light guiding direction of the light guide section, and the second direction is a direction that is perpendicular to the first direction and parallel to the first surface.

6. The virtual image display device according to claim 1, wherein the first peripheral area or the first junction surface of the prism includes a non-smooth surface having an undulation, and the second peripheral area or the first junction surface of the light transmitting body member includes the non-smooth surface.

7. The virtual image display device according to claim 6, wherein the non-smooth surface is a rough surface provided with a fine undulation.

8. The virtual image display device according to claim 6, wherein the first peripheral area and the first junction surface of the prism includes a non-smooth surface having an undulation, and the second peripheral area and the first junction surface of the light transmitting body member include the non-smooth surface.

9. The virtual image display device according to claim 8, wherein the non-smooth surface provided to the first peripheral area and the non-smooth surface provided to the first junction surface of the prism fit each other, and the non-smooth surface provided to the second peripheral area and the non-smooth surface provided to the first junction surface of the light transmitting body member fit each other.

10. The virtual image display device according to claim 6, wherein the non-smooth surface provided to the first peripheral area and the non-smooth surface provided to the first junction surface of the prism have undulation shapes reverse to each other, and the non-smooth surface provided to the second peripheral area and the non-smooth surface provided to the first junction surface of the light transmitting body member have undulation shapes reverse to each other.

11. The virtual image display device according to claim 1, wherein the light guide body member, the prism, and the light transmitting body member are formed of respective materials having roughly the same refractive indexes.

\* \* \* \* \*